US012626200B1

(12) United States Patent
Liu et al.

(10) Patent No.: US 12,626,200 B1
(45) Date of Patent: May 12, 2026

(54) CHARGE CONTROL

(71) Applicant: Samsara Inc., San Francisco, CA (US)

(72) Inventors: Alan Liu, London (GB); Fatma Kevser Akcay, London (GB); Andrii Sliusar, London (GB); Paolo Caminiti, London (GB); Andrea Harpprecht, London (GB); Joe Downard, London (GB); Deepti Yenireddy, San Jose, CA (US); Ethan Wood, London (GB)

(73) Assignee: Samsara Inc., San Francisco, CA (US)

( * ) Notice: Subject to any disclaimer, the term of this patent is extended or adjusted under 35 U.S.C. 154(b) by 0 days.

(21) Appl. No.: 18/641,201

(22) Filed: Apr. 19, 2024

(51) Int. Cl.
*G06Q 10/0631* (2023.01)
*B60L 58/12* (2019.01)
*G07C 5/00* (2006.01)

(52) U.S. Cl.
CPC ........ *G06Q 10/06311* (2013.01); *B60L 58/12* (2019.02); *G07C 5/008* (2013.01)

(58) Field of Classification Search
CPC ........ B60L 58/12; B60L 1/00–2270/46; G06Q 10/06311; G07C 5/008
USPC ........................................ 701/29.3
See application file for complete search history.

(56) References Cited

U.S. PATENT DOCUMENTS

| | | | |
|---|---|---|---|
| 4,671,111 | A | 6/1987 | Lemelson |
| 5,825,283 | A | 10/1998 | Camhi |
| 5,917,433 | A | 6/1999 | Kelllor et al. |

| | | | |
|---|---|---|---|
| 6,064,299 | A | 5/2000 | Lesesky et al. |
| 6,098,048 | A | 8/2000 | Dashefsky et al. |
| 6,157,864 | A | 12/2000 | Schwenke et al. |
| 6,253,129 | B1 | 6/2001 | Jenkins et al. |

(Continued)

FOREIGN PATENT DOCUMENTS

| | | |
|---|---|---|
| CN | 111047179 A | 4/2020 |
| DE | 10 2004 015 221 A1 | 10/2005 |

(Continued)

OTHER PUBLICATIONS

"5 Minutes", Netradyne, [publication date unknown], (filed in: In the Matter of Certain Vehicle Telematics, Fleet Management, and Video-Based Safety Systems, Devices, and Components thereof, Investigation No. 337-TA-1393, complaint filed Feb. 8, 2024), in 1 page (ND_ITC_0014).

(Continued)

*Primary Examiner* — Mohamed Abdo Algehaim
(74) *Attorney, Agent, or Firm* — Knobbe, Martens, Olson & Bear LLP

(57) ABSTRACT

An electric vehicle (EV) charge management system is configured to monitor, manage, and optimize EV charging processes. The system can continuously monitor charge-related data from various sources, including the EVs themselves, charging infrastructure providers, schedule data, and/ or other relevant systems, to identify charging issues in real-time. Users can define customized charge profiles for each EV or groups of EVs, such as target charge levels (e.g., 80%), low charge levels (e.g., 20%), charging schedules, maximum charging rates, and/or other criteria that are indicative of a potential charging issue. These charge profiles allow users to have greater control over the charging process, ensuring that their EVs are charged in a way that reduces fleet downtime (e.g., charging time in the middle of a driver's shift) and optimizes productivity of the fleet.

19 Claims, 10 Drawing Sheets

(56) References Cited

U.S. PATENT DOCUMENTS

| | | | |
|---|---|---|---|
| 6,317,668 B1 | 11/2001 | Thibault et al. |
| 6,411,203 B1 | 6/2002 | Lesesky et al. |
| 6,421,590 B2 | 7/2002 | Thibault |
| 6,452,487 B1 | 9/2002 | Krupinski |
| 6,505,106 B1 | 1/2003 | Lawrence et al. |
| 6,651,063 B1 | 11/2003 | Vorobiev |
| 6,714,894 B1 | 3/2004 | Tobey et al. |
| 6,718,239 B2 | 4/2004 | Rayner |
| 6,741,165 B1 | 5/2004 | Langfahl et al. |
| 6,801,920 B1 | 10/2004 | Wischinski |
| 7,117,075 B1 | 10/2006 | Larschan et al. |
| 7,139,780 B2 | 11/2006 | Lee et al. |
| 7,209,959 B1 | 4/2007 | Campbell et al. |
| 7,233,684 B2 | 6/2007 | Fedorovskaya et al. |
| 7,386,376 B2 | 6/2008 | Basir et al. |
| 7,389,178 B2 | 6/2008 | Raz et al. |
| 7,398,298 B2 | 7/2008 | Koch |
| 7,492,938 B2 | 2/2009 | Brinson, Jr. et al. |
| 7,526,103 B2 | 4/2009 | Schofield et al. |
| 7,555,378 B2 | 6/2009 | Larschan et al. |
| 7,596,417 B2 | 9/2009 | Fister et al. |
| 7,606,779 B2 | 10/2009 | Brinson, Jr. et al. |
| 7,715,961 B1 | 5/2010 | Kargupta |
| 7,769,499 B2 | 8/2010 | McQuade et al. |
| 7,844,088 B2 | 11/2010 | Brinson, Jr. et al. |
| 7,859,392 B2 | 12/2010 | McClellan et al. |
| 7,877,198 B2 | 1/2011 | Tenzer et al. |
| 7,881,838 B2 | 2/2011 | Larschan et al. |
| 7,957,936 B2 | 6/2011 | Eryurek et al. |
| 8,019,581 B2 | 9/2011 | Sheha et al. |
| 8,024,311 B2 | 9/2011 | Wood et al. |
| 8,032,277 B2 | 10/2011 | Larschan et al. |
| 8,140,358 B1 | 3/2012 | Ling et al. |
| 8,156,108 B2 | 4/2012 | Middleton et al. |
| 8,156,499 B2 | 4/2012 | Foulger et al. |
| 8,169,343 B2 | 5/2012 | Sheha et al. |
| 8,175,992 B2 | 5/2012 | Bass, II et al. |
| 8,230,272 B2 | 7/2012 | Middleton et al. |
| 8,260,489 B2 | 9/2012 | Nielsen et al. |
| 8,417,402 B2 | 4/2013 | Basir |
| 8,442,508 B2 | 5/2013 | Harter et al. |
| 8,457,395 B2 | 6/2013 | Boncyk et al. |
| 8,509,412 B2 | 8/2013 | Sheha et al. |
| 8,543,625 B2 | 9/2013 | Middleton et al. |
| 8,560,164 B2 | 10/2013 | Nielsen et al. |
| 8,615,555 B2 | 12/2013 | Koch |
| 8,625,885 B2 | 1/2014 | Brinson, Jr. et al. |
| 8,626,568 B2 | 1/2014 | Warkentin et al. |
| 8,633,672 B2 | 1/2014 | Jung et al. |
| 8,669,857 B2 | 3/2014 | Sun et al. |
| 8,682,572 B2 | 3/2014 | Raz et al. |
| 8,706,409 B2 | 4/2014 | Mason et al. |
| 8,831,825 B2 | 9/2014 | Shah et al. |
| 8,836,784 B2 | 9/2014 | Erhardt et al. |
| 8,918,229 B2 | 12/2014 | Hunt et al. |
| 8,953,228 B1 | 2/2015 | Mehers |
| 8,989,914 B1 | 3/2015 | Nemat-Nasser et al. |
| 8,989,959 B2 | 3/2015 | Plante et al. |
| 8,996,240 B2 | 3/2015 | Plante |
| 9,024,744 B2 | 5/2015 | Klose et al. |
| 9,053,590 B1 | 6/2015 | Kator et al. |
| 9,137,498 B1 | 9/2015 | L'Heureux et al. |
| 9,147,335 B2 | 9/2015 | Raghunathan et al. |
| 9,152,609 B2 | 10/2015 | Schwartz et al. |
| 9,165,196 B2 | 10/2015 | Kesavan et al. |
| 9,170,913 B2 | 10/2015 | Hunt et al. |
| 9,189,895 B2 | 11/2015 | Phelan et al. |
| 9,230,250 B1 | 1/2016 | Parker et al. |
| 9,230,437 B2 | 1/2016 | Brinton et al. |
| 9,280,435 B2 | 3/2016 | Hunt et al. |
| 9,311,271 B2 | 4/2016 | Wright |
| 9,344,683 B1 | 5/2016 | Nemat-Nasser et al. |
| 9,349,228 B2 | 5/2016 | Ochsendorf et al. |
| 9,384,111 B2 | 7/2016 | Hunt et al. |
| 9,389,147 B1 | 7/2016 | Lambert et al. |
| 9,402,060 B2 | 7/2016 | Plante |
| 9,412,282 B2 | 8/2016 | Hunt et al. |
| 9,439,280 B2 | 9/2016 | Chang et al. |
| 9,445,270 B1 | 9/2016 | Bicket et al. |
| 9,477,639 B2 | 10/2016 | Fischer et al. |
| 9,477,989 B2 | 10/2016 | Grimm et al. |
| 9,527,515 B2 | 12/2016 | Hunt et al. |
| 9,594,725 B1 | 3/2017 | Cook et al. |
| 9,672,667 B2 | 6/2017 | Mason et al. |
| 9,688,282 B2 | 6/2017 | Cook et al. |
| 9,728,015 B2 | 8/2017 | Kwak |
| 9,761,063 B2 | 9/2017 | Lambert et al. |
| 9,761,067 B2 | 9/2017 | Plante et al. |
| 9,811,536 B2 | 11/2017 | Morris et al. |
| 9,818,088 B2 | 11/2017 | Penilla et al. |
| 9,846,979 B1 | 12/2017 | Sainaney et al. |
| 9,849,834 B2 | 12/2017 | Reed et al. |
| 9,852,625 B2 | 12/2017 | Victor et al. |
| 9,892,376 B2 | 2/2018 | Pfeiffer et al. |
| 9,922,567 B2 | 3/2018 | Molin et al. |
| 9,934,628 B2 | 4/2018 | Kreiner et al. |
| 9,996,980 B1 | 6/2018 | Gonzalez et al. |
| 10,015,452 B1 | 7/2018 | Schofield et al. |
| 10,033,706 B2 | 7/2018 | Bicket et al. |
| 10,040,459 B1 | 8/2018 | Kukreja |
| 10,065,652 B2 | 9/2018 | Shenoy et al. |
| 10,068,392 B2 | 9/2018 | Cook et al. |
| 10,075,669 B2 | 9/2018 | Vanman et al. |
| 10,083,547 B1 | 9/2018 | Tomatsu |
| 10,085,149 B2 | 9/2018 | Bicket et al. |
| 10,094,308 B2 | 10/2018 | Kolhouse et al. |
| 10,102,495 B1 | 10/2018 | Zhang et al. |
| 10,127,810 B2 | 11/2018 | Durie, Jr. et al. |
| 10,157,321 B2 | 12/2018 | Becker et al. |
| 10,173,486 B1 | 1/2019 | Lee et al. |
| 10,173,544 B2 | 1/2019 | Hendrix et al. |
| 10,196,071 B1 | 2/2019 | Rowson et al. |
| 10,206,107 B2 | 2/2019 | Bicket et al. |
| 10,223,935 B2 | 3/2019 | Sweany et al. |
| 10,275,959 B2 | 4/2019 | Ricci |
| 10,286,875 B2 | 5/2019 | Penilla et al. |
| 10,290,036 B1 | 5/2019 | Gella et al. |
| 10,311,749 B1 | 6/2019 | Kypri et al. |
| 10,336,190 B2 | 7/2019 | Yokochi et al. |
| 10,388,075 B2 | 8/2019 | Schmirler et al. |
| 10,389,739 B2 | 8/2019 | Solotorevsky |
| 10,390,227 B2 | 8/2019 | Bicket et al. |
| 10,444,949 B2 | 10/2019 | Scott et al. |
| 10,445,559 B2 | 10/2019 | Joseph et al. |
| 10,459,444 B1 | 10/2019 | Kentley-Klay |
| 10,460,183 B2 | 10/2019 | Welland et al. |
| 10,460,600 B2 | 10/2019 | Julian et al. |
| 10,471,955 B2 | 11/2019 | Kouri et al. |
| 10,486,709 B1 | 11/2019 | Mezaael |
| 10,489,222 B2 | 11/2019 | Sathyanarayana et al. |
| 10,523,904 B2 | 12/2019 | Mahmoud et al. |
| 10,573,183 B1 | 2/2020 | Li et al. |
| 10,579,123 B2 | 3/2020 | Tuan et al. |
| 10,609,114 B1 | 3/2020 | Bicket et al. |
| 10,621,873 B1 | 4/2020 | Spiel et al. |
| 10,623,899 B2 | 4/2020 | Watkins et al. |
| 10,632,941 B2 | 4/2020 | Chauncey et al. |
| 10,652,335 B2 | 5/2020 | Botticelli |
| 10,715,976 B2 | 7/2020 | Hoffner et al. |
| 10,762,363 B2 | 9/2020 | Watanabe |
| 10,782,691 B2 | 9/2020 | Suresh et al. |
| 10,788,990 B2 | 9/2020 | Kim et al. |
| 10,789,840 B2 | 9/2020 | Boykin et al. |
| 10,803,496 B1 | 10/2020 | Hopkins |
| 10,818,109 B2 | 10/2020 | Palmer et al. |
| 10,827,324 B1 | 11/2020 | Hajimiri et al. |
| 10,843,659 B1 | 11/2020 | Innocenzi et al. |
| 10,848,670 B2 | 11/2020 | Gatti et al. |
| 10,878,030 B1 | 12/2020 | Lambert et al. |
| 10,969,852 B2 | 4/2021 | Tuan et al. |
| 10,979,871 B2 | 4/2021 | Hajimiri et al. |
| 10,999,269 B2 | 5/2021 | Bicket et al. |
| 10,999,374 B2 | 5/2021 | ElHattab et al. |
| 11,046,205 B1 | 6/2021 | Govan et al. |

(56)  References Cited

U.S. PATENT DOCUMENTS

| | | | |
|---|---|---|---|
| 11,069,257 B2 | 7/2021 | Palmer et al. | |
| 11,080,568 B2 | 8/2021 | ElHattab et al. | |
| 11,122,488 B1 | 9/2021 | Lloyd et al. | |
| 11,126,910 B1 | 9/2021 | Akhtar et al. | |
| 11,127,130 B1 | 9/2021 | Jain et al. | |
| 11,131,986 B1 | 9/2021 | Gal et al. | |
| 11,132,853 B1 | 9/2021 | Akhtar et al. | |
| 11,137,744 B1 | 10/2021 | Heddleston et al. | |
| 11,142,175 B2 | 10/2021 | Chow et al. | |
| 11,158,177 B1 | 10/2021 | ElHattab et al. | |
| 11,184,422 B1 | 11/2021 | Bicket et al. | |
| 11,188,046 B1 | 11/2021 | ElHattab et al. | |
| 11,190,373 B1 | 11/2021 | Stevenson et al. | |
| 11,204,637 B2 | 12/2021 | Tuan et al. | |
| 11,260,878 B2 | 3/2022 | Palmer et al. | |
| 11,341,786 B1 | 5/2022 | Calmer et al. | |
| 11,349,901 B1 | 5/2022 | Duffield et al. | |
| 11,352,013 B1 | 6/2022 | Srinivasan et al. | |
| 11,352,014 B1 | 6/2022 | Srinivasan et al. | |
| 11,356,605 B1 | 6/2022 | Shemet et al. | |
| 11,356,909 B1 | 6/2022 | Lloyd | |
| 11,365,980 B1 | 6/2022 | Akhtar et al. | |
| 11,386,325 B1 | 7/2022 | Srinivasan et al. | |
| 11,436,844 B2 | 9/2022 | Carruthers et al. | |
| 11,447,024 B1* | 9/2022 | Brannan | G05D 1/247 |
| 11,451,610 B1 | 9/2022 | Saunders et al. | |
| 11,451,611 B1 | 9/2022 | Saunders et al. | |
| 11,460,507 B2 | 10/2022 | Lloyd et al. | |
| 11,464,079 B1 | 10/2022 | Aschenbener et al. | |
| 11,479,142 B1* | 10/2022 | Govan | B60W 50/14 |
| 11,494,921 B2 | 11/2022 | ElHattab et al. | |
| 11,522,857 B1 | 12/2022 | Symons et al. | |
| 11,532,169 B1 | 12/2022 | Hassan et al. | |
| 11,558,449 B1 | 1/2023 | Bicket et al. | |
| 11,595,632 B2 | 2/2023 | Tsai et al. | |
| 11,599,097 B1 | 3/2023 | Gal et al. | |
| 11,606,736 B1 | 3/2023 | Lloyd et al. | |
| 11,611,621 B2 | 3/2023 | ElHattab et al. | |
| 11,615,141 B1 | 3/2023 | Hoye et al. | |
| 11,620,909 B2 | 4/2023 | Tsai et al. | |
| 11,627,252 B2 | 4/2023 | Delegard et al. | |
| 11,641,388 B1 | 5/2023 | Saunders et al. | |
| 11,641,604 B1 | 5/2023 | Lloyd | |
| 11,643,102 B1 | 5/2023 | Calmer et al. | |
| 11,659,060 B2 | 5/2023 | Davis et al. | |
| 11,665,223 B1 | 5/2023 | Duffield et al. | |
| 11,669,714 B1 | 6/2023 | Akhtar et al. | |
| 11,671,478 B1 | 6/2023 | Saunders et al. | |
| 11,674,813 B1 | 6/2023 | Chung et al. | |
| 11,675,042 B1 | 6/2023 | Lloyd et al. | |
| 11,683,579 B1 | 6/2023 | Symons et al. | |
| 11,688,211 B1 | 6/2023 | Calmer et al. | |
| 11,694,317 B1 | 7/2023 | Jain et al. | |
| 11,704,984 B1 | 7/2023 | ElHattab et al. | |
| 11,709,500 B2 | 7/2023 | Lloyd et al. | |
| 11,710,409 B2 | 7/2023 | Nanda et al. | |
| 11,720,087 B1 | 8/2023 | Heddleston et al. | |
| 11,727,054 B2 | 8/2023 | Grandhl et al. | |
| 11,731,469 B1 | 8/2023 | McGillan | |
| 11,736,312 B1 | 8/2023 | Xiao et al. | |
| 11,741,760 B1 | 8/2023 | Dubin et al. | |
| 11,748,377 B1 | 9/2023 | Zhang et al. | |
| 11,752,895 B1 | 9/2023 | Govan et al. | |
| 11,756,346 B1 | 9/2023 | Wu et al. | |
| 11,756,351 B1 | 9/2023 | Akhtar et al. | |
| 11,758,096 B2 | 9/2023 | Shah et al. | |
| 11,776,328 B2 | 10/2023 | Yang et al. | |
| 11,780,446 B1 | 10/2023 | Srinivasan et al. | |
| 11,782,930 B2 | 10/2023 | McGee et al. | |
| 11,787,413 B2 | 10/2023 | Tsai et al. | |
| 11,798,187 B2 | 10/2023 | Zaheer et al. | |
| 11,798,298 B2 | 10/2023 | Hassan et al. | |
| 11,800,317 B1 | 10/2023 | Dugar et al. | |
| 11,838,884 B1 | 12/2023 | Dergosits et al. | |
| 11,842,577 B1 | 12/2023 | Harrison et al. | |
| 11,847,911 B2 | 12/2023 | ElHattab et al. | |
| 11,855,801 B1 | 12/2023 | Stevenson et al. | |
| 11,861,955 B1 | 1/2024 | Dubin et al. | |
| 11,863,712 B1 | 1/2024 | Young et al. | |
| 11,866,055 B1 | 1/2024 | Srinivasan et al. | |
| 11,868,919 B1 | 1/2024 | Zhang et al. | |
| 11,875,580 B2 | 1/2024 | Hassan et al. | |
| 11,875,683 B1 | 1/2024 | Tsai et al. | |
| 11,890,962 B1 | 2/2024 | Govan et al. | |
| 11,937,152 B2 | 3/2024 | Hajimiri et al. | |
| 11,938,948 B1 | 3/2024 | Davis et al. | |
| 11,959,772 B2 | 4/2024 | Robbins et al. | |
| 11,974,410 B1 | 4/2024 | Lin et al. | |
| 11,975,685 B1 | 5/2024 | Innocenzi et al. | |
| 11,989,001 B1 | 5/2024 | ElHattab et al. | |
| 11,995,546 B1 | 5/2024 | Srinivasan et al. | |
| 11,997,181 B1 | 5/2024 | Davis et al. | |
| 12,000,940 B1 | 6/2024 | Lloyd et al. | |
| 12,106,613 B2 | 10/2024 | Calmer et al. | |
| 12,117,546 B1 | 10/2024 | Lloyd et al. | |
| 12,126,917 B1 | 10/2024 | Shemet et al. | |
| 12,128,919 B2 | 10/2024 | Calmer et al. | |
| 12,140,445 B1 | 11/2024 | Akhtar et al. | |
| 12,150,186 B1 | 11/2024 | Aguilar et al. | |
| 12,165,360 B1 | 12/2024 | Jain et al. | |
| 12,168,445 B1 | 12/2024 | Srinivasan et al. | |
| 12,172,653 B1 | 12/2024 | Akhtar et al. | |
| 12,179,629 B1 | 12/2024 | Govan et al. | |
| 12,194,880 B1* | 1/2025 | Yang | G06Q 10/02 |
| 12,197,610 B2 | 1/2025 | Wen et al. | |
| 12,213,090 B1 | 1/2025 | Dergosits et al. | |
| 12,228,944 B1 | 2/2025 | Dubin et al. | |
| 12,253,617 B1 | 3/2025 | Aguilar et al. | |
| 12,256,021 B1 | 3/2025 | Torres et al. | |
| 12,260,616 B1 | 3/2025 | Rajan et al. | |
| 12,269,498 B1 | 4/2025 | Rommel et al. | |
| 12,289,181 B1 | 4/2025 | Stevenson et al. | |
| 12,306,010 B1 | 5/2025 | Rommel et al. | |
| 12,327,445 B1 | 6/2025 | Eberhardt et al. | |
| 12,328,639 B1 | 6/2025 | Smith et al. | |
| 12,344,168 B1 | 7/2025 | Wang et al. | |
| 12,346,712 B1 | 7/2025 | Eberhardt et al. | |
| 12,367,718 B1 | 7/2025 | Calmer et al. | |
| 12,368,903 B1 | 7/2025 | Lin et al. | |
| 12,399,022 B2* | 8/2025 | Kato | B60L 58/13 |
| 2002/0061758 A1 | 5/2002 | Zarlengo et al. | |
| 2002/0128751 A1 | 9/2002 | Engstrom et al. | |
| 2002/0169850 A1 | 11/2002 | Batke et al. | |
| 2003/0081935 A1 | 5/2003 | Kirmuss | |
| 2003/0154009 A1 | 8/2003 | Basir et al. | |
| 2004/0093264 A1 | 5/2004 | Shimizu | |
| 2004/0236476 A1 | 11/2004 | Chowdhary | |
| 2004/0236596 A1 | 11/2004 | Chowdhary et al. | |
| 2005/0131585 A1 | 6/2005 | Luskin et al. | |
| 2005/0131646 A1 | 6/2005 | Camus | |
| 2005/0286774 A1 | 12/2005 | Porikli | |
| 2006/0167591 A1 | 7/2006 | McNally | |
| 2007/0050108 A1 | 3/2007 | Larschan et al. | |
| 2007/0173991 A1 | 7/2007 | Tenzer et al. | |
| 2008/0252487 A1 | 10/2008 | McClellan et al. | |
| 2008/0319602 A1 | 12/2008 | McClellan et al. | |
| 2009/0099724 A1 | 4/2009 | Kranz et al. | |
| 2009/0141939 A1 | 6/2009 | Chambers et al. | |
| 2009/0240427 A1 | 9/2009 | Siereveld et al. | |
| 2010/0030586 A1 | 2/2010 | Taylor et al. | |
| 2010/0049639 A1 | 2/2010 | Ferro et al. | |
| 2010/0281161 A1 | 11/2010 | Cohn et al. | |
| 2011/0060496 A1 | 3/2011 | Nielsen et al. | |
| 2011/0093306 A1 | 4/2011 | Nielsen et al. | |
| 2011/0234749 A1 | 9/2011 | Alon | |
| 2011/0276265 A1 | 11/2011 | Husain | |
| 2012/0109418 A1 | 5/2012 | Lorber | |
| 2012/0173292 A1* | 7/2012 | Solomon | G06Q 50/40 |
| | | | 705/5 |
| 2012/0194357 A1 | 8/2012 | Ciolli | |
| 2012/0201277 A1 | 8/2012 | Tanner et al. | |
| 2012/0218416 A1 | 8/2012 | Leny et al. | |
| 2012/0233077 A1* | 9/2012 | Tate, Jr. | G06Q 10/20 |
| | | | 705/65 |

(56)  References Cited

U.S. PATENT DOCUMENTS

| | | | |
|---|---|---|---|
| 2012/0235625 A1 | 9/2012 | Takehara | |
| 2012/0262104 A1 | 10/2012 | Kirsch | |
| 2012/0280653 A1* | 11/2012 | Prosser | B60L 53/305 |
| | | | 320/109 |
| 2012/0303397 A1 | 11/2012 | Prosser | |
| 2013/0073112 A1 | 3/2013 | Phelan et al. | |
| 2013/0162421 A1 | 6/2013 | Inaguma et al. | |
| 2013/0162425 A1 | 6/2013 | Raghunathan et al. | |
| 2013/0164713 A1 | 6/2013 | Hunt et al. | |
| 2013/0211559 A1 | 8/2013 | Lawson et al. | |
| 2013/0244210 A1 | 9/2013 | Nath et al. | |
| 2013/0250040 A1 | 9/2013 | Vitsnudel et al. | |
| 2013/0332004 A1 | 12/2013 | Gompert et al. | |
| 2014/0012492 A1 | 1/2014 | Bowers et al. | |
| 2014/0095061 A1 | 4/2014 | Hyde | |
| 2014/0098060 A1 | 4/2014 | McQuade et al. | |
| 2014/0113619 A1 | 4/2014 | Tibbitts et al. | |
| 2014/0142770 A1* | 5/2014 | Sellschopp | B60L 58/12 |
| | | | 700/291 |
| 2014/0159660 A1 | 6/2014 | Klose et al. | |
| 2014/0195106 A1 | 7/2014 | McQuade et al. | |
| 2014/0223090 A1 | 8/2014 | Malone | |
| 2014/0278108 A1 | 9/2014 | Kerrigan et al. | |
| 2014/0293069 A1 | 10/2014 | Lazar et al. | |
| 2014/0328517 A1 | 11/2014 | Gluncic | |
| 2014/0337429 A1 | 11/2014 | Asenjo et al. | |
| 2014/0354227 A1 | 12/2014 | Tyagi et al. | |
| 2014/0354228 A1 | 12/2014 | Williams et al. | |
| 2015/0025734 A1 | 1/2015 | Cook et al. | |
| 2015/0044641 A1 | 2/2015 | Chauncey et al. | |
| 2015/0074091 A1 | 3/2015 | Walkin et al. | |
| 2015/0116114 A1 | 4/2015 | Boyles | |
| 2015/0226563 A1 | 8/2015 | Cox et al. | |
| 2015/0283912 A1 | 10/2015 | Shimizu et al. | |
| 2015/0347121 A1 | 12/2015 | Harumoto | |
| 2016/0046298 A1 | 2/2016 | DeRuyck et al. | |
| 2016/0110066 A1 | 4/2016 | McCormick et al. | |
| 2016/0176401 A1 | 6/2016 | Pilkington | |
| 2016/0275376 A1 | 9/2016 | Kant | |
| 2016/0288744 A1 | 10/2016 | Rutherford et al. | |
| 2016/0293049 A1 | 10/2016 | Monahan et al. | |
| 2016/0343091 A1 | 11/2016 | Han et al. | |
| 2016/0359339 A1* | 12/2016 | Hwang | H02J 7/0049 |
| 2016/0375780 A1 | 12/2016 | Penilla et al. | |
| 2017/0039784 A1 | 2/2017 | Gelbart et al. | |
| 2017/0060726 A1 | 3/2017 | Glistvain | |
| 2017/0102463 A1 | 4/2017 | Hwang | |
| 2017/0123397 A1 | 5/2017 | Billi et al. | |
| 2017/0124476 A1 | 5/2017 | Levinson et al. | |
| 2017/0129348 A1* | 5/2017 | Jang | B60L 53/11 |
| 2017/0129360 A1* | 5/2017 | Park | B60L 53/14 |
| 2017/0140603 A1 | 5/2017 | Ricci | |
| 2017/0195265 A1 | 7/2017 | Billi et al. | |
| 2017/0200061 A1 | 7/2017 | Julian et al. | |
| 2017/0263049 A1 | 9/2017 | MacDonald et al. | |
| 2017/0263120 A1 | 9/2017 | Durie, Jr. et al. | |
| 2017/0278004 A1 | 9/2017 | McElhinney et al. | |
| 2017/0286838 A1 | 10/2017 | Cipriani et al. | |
| 2017/0291611 A1 | 10/2017 | Innes et al. | |
| 2017/0291800 A1 | 10/2017 | Scoville et al. | |
| 2017/0323641 A1 | 11/2017 | Shimizu et al. | |
| 2017/0332199 A1 | 11/2017 | Elliott et al. | |
| 2017/0345283 A1 | 11/2017 | Kwon et al. | |
| 2017/0366935 A1 | 12/2017 | Ahmadzadeh et al. | |
| 2018/0001771 A1 | 1/2018 | Park et al. | |
| 2018/0001899 A1 | 1/2018 | Shenoy et al. | |
| 2018/0012196 A1 | 1/2018 | Ricci et al. | |
| 2018/0025636 A1 | 1/2018 | Boykin et al. | |
| 2018/0063576 A1 | 3/2018 | Tillman et al. | |
| 2018/0068206 A1 | 3/2018 | Pollach et al. | |
| 2018/0072313 A1 | 3/2018 | Stenneth | |
| 2018/0075309 A1 | 3/2018 | Sathyanarayana et al. | |
| 2018/0093672 A1 | 4/2018 | Terwilliger et al. | |
| 2018/0134176 A1* | 5/2018 | Symanow | B60L 58/20 |
| 2018/0174485 A1 | 6/2018 | Stankoulov | |
| 2018/0186245 A1* | 7/2018 | Díaz | B60L 53/665 |
| 2018/0202825 A1* | 7/2018 | You | G08G 1/20 |
| 2018/0234514 A1 | 8/2018 | Rajiv et al. | |
| 2018/0247109 A1 | 8/2018 | Joseph et al. | |
| 2018/0253109 A1 | 9/2018 | Fontaine et al. | |
| 2018/0262724 A1 | 9/2018 | Ross | |
| 2018/0295141 A1 | 10/2018 | Solotorevsky | |
| 2018/0329381 A1 | 11/2018 | Doh et al. | |
| 2018/0356800 A1 | 12/2018 | Chao et al. | |
| 2018/0357484 A1 | 12/2018 | Omata | |
| 2018/0364686 A1 | 12/2018 | Naidoo et al. | |
| 2019/0003848 A1 | 1/2019 | Hoten et al. | |
| 2019/0007690 A1 | 1/2019 | Varadarajan et al. | |
| 2019/0054876 A1 | 2/2019 | Ferguson et al. | |
| 2019/0064849 A1* | 2/2019 | O'Hara | B60L 53/36 |
| 2019/0065951 A1 | 2/2019 | Luo et al. | |
| 2019/0077308 A1 | 3/2019 | Kashchenko | |
| 2019/0118655 A1 | 4/2019 | Grimes et al. | |
| 2019/0120947 A1 | 4/2019 | Wheeler et al. | |
| 2019/0174158 A1 | 6/2019 | Herrick et al. | |
| 2019/0178678 A1* | 6/2019 | Rahbari Asr | B60L 53/66 |
| 2019/0188847 A1 | 6/2019 | Gonzalez et al. | |
| 2019/0244301 A1 | 8/2019 | Seth et al. | |
| 2019/0257661 A1 | 8/2019 | Stentz et al. | |
| 2019/0265712 A1 | 8/2019 | Satzoda et al. | |
| 2019/0272725 A1 | 9/2019 | Viklund et al. | |
| 2019/0286948 A1 | 9/2019 | Sathyanarayana et al. | |
| 2019/0303718 A1 | 10/2019 | Tanigawa et al. | |
| 2019/0304082 A1 | 10/2019 | Tokashiki et al. | |
| 2019/0308509 A1* | 10/2019 | Herman | B60L 53/35 |
| 2019/0308510 A1* | 10/2019 | Beaurepaire | B60K 35/60 |
| 2019/0318419 A1 | 10/2019 | VanderZanden | |
| 2019/0318549 A1 | 10/2019 | Zeira et al. | |
| 2019/0327590 A1 | 10/2019 | Kubo et al. | |
| 2019/0370581 A1 | 12/2019 | Cordell et al. | |
| 2020/0018612 A1 | 1/2020 | Wolcott | |
| 2020/0026282 A1 | 1/2020 | Choe et al. | |
| 2020/0050182 A1 | 2/2020 | Cheng et al. | |
| 2020/0074326 A1 | 3/2020 | Balakrishnan et al. | |
| 2020/0074397 A1 | 3/2020 | Burda et al. | |
| 2020/0139847 A1 | 5/2020 | Baumer et al. | |
| 2020/0162489 A1 | 5/2020 | Bar-Nahum et al. | |
| 2020/0164509 A1 | 5/2020 | Shults et al. | |
| 2020/0168094 A1 | 5/2020 | Shimodaira et al. | |
| 2020/0231058 A1* | 7/2020 | Hishida | B60L 55/00 |
| 2020/0262303 A1* | 8/2020 | Dow | H02J 7/00036 |
| 2020/0283003 A1 | 9/2020 | Raichelgauz | |
| 2020/0311602 A1 | 10/2020 | Hawley et al. | |
| 2020/0312155 A1 | 10/2020 | Kelkar et al. | |
| 2020/0327009 A1 | 10/2020 | Callison et al. | |
| 2020/0327369 A1 | 10/2020 | Cruz et al. | |
| 2020/0342230 A1 | 10/2020 | Tsai et al. | |
| 2020/0342506 A1 | 10/2020 | Levy et al. | |
| 2020/0371773 A1 | 11/2020 | Kato et al. | |
| 2020/0380806 A1 | 12/2020 | Tabata | |
| 2020/0389415 A1 | 12/2020 | Zhao et al. | |
| 2021/0086651 A1* | 3/2021 | Maeda | B60L 53/66 |
| 2021/0094435 A1* | 4/2021 | Rechkemmer | B60L 53/66 |
| 2021/0097315 A1 | 4/2021 | Carruthers et al. | |
| 2021/0213848 A1* | 7/2021 | Sun | G06Q 10/02 |
| 2021/0312724 A1* | 10/2021 | Petri | H04W 4/40 |
| 2021/0397908 A1 | 12/2021 | ElHattab et al. | |
| 2022/0089055 A1* | 3/2022 | TenHouten | H02J 7/00032 |
| 2022/0165073 A1 | 5/2022 | Shikli et al. | |
| 2022/0194256 A1* | 6/2022 | Nakamura | B60L 58/12 |
| 2022/0207450 A1* | 6/2022 | Francis | G06F 16/2455 |
| 2022/0228877 A1* | 7/2022 | Feldman | G01C 21/3476 |
| 2022/0289203 A1 | 9/2022 | Makilya et al. | |
| 2022/0348105 A1* | 11/2022 | Sujan | B60L 53/63 |
| 2022/0348106 A1* | 11/2022 | Sujan | B60L 53/63 |
| 2022/0363140 A1* | 11/2022 | Dayal | G01C 21/3469 |
| 2022/0374737 A1 | 11/2022 | Dhara et al. | |
| 2022/0388414 A1* | 12/2022 | Salter | B60L 53/305 |
| 2022/0410750 A1* | 12/2022 | Mangal | B60L 53/62 |
| 2023/0032212 A1 | 2/2023 | Jensen et al. | |
| 2023/0051148 A1* | 2/2023 | Appelbaum | B60L 53/63 |
| 2023/0077207 A1 | 3/2023 | Hassan et al. | |
| 2023/0147695 A1* | 5/2023 | Earl | H02J 7/0048 |
| | | | 320/109 |

(56)                    References Cited

U.S. PATENT DOCUMENTS

| | | | |
|---|---|---|---|
| 2023/0152111 A1* | 5/2023 | Maeda | G01C 21/3476 |
| | | | 701/423 |
| 2023/0153735 A1 | 5/2023 | Dhara et al. | |
| 2023/0169420 A1 | 6/2023 | Dhara et al. | |
| 2023/0211694 A1* | 7/2023 | Zhou | G06Q 50/40 |
| 2023/0219592 A1 | 7/2023 | Calmer et al. | |
| 2023/0281553 A1 | 9/2023 | Singh et al. | |
| 2023/0289841 A1* | 9/2023 | Hanashima | B60L 53/14 |
| 2023/0294535 A1* | 9/2023 | Eslinger | B60L 58/12 |
| | | | 320/109 |
| 2023/0294546 A1* | 9/2023 | Takahashi | H02J 7/0071 |
| | | | 320/109 |
| 2023/0298410 A1 | 9/2023 | Calmer et al. | |
| 2023/0305568 A1* | 9/2023 | Telpaz | B60L 53/67 |
| 2023/0322112 A1* | 10/2023 | Sun | B60L 53/65 |
| | | | 320/109 |
| 2023/0322121 A1 | 10/2023 | Wang et al. | |
| 2024/0003749 A1 | 1/2024 | Lin et al. | |
| 2024/0005678 A1 | 1/2024 | Hassan et al. | |
| 2024/0013423 A1 | 1/2024 | Zaheer et al. | |
| 2024/0020667 A1* | 1/2024 | Allamsetty | G06Q 50/40 |
| 2024/0025270 A1* | 1/2024 | Farrokhabadi | G06N 3/09 |
| 2024/0063596 A1 | 2/2024 | Pandian et al. | |
| 2024/0067031 A1* | 2/2024 | Meroux | B60L 53/305 |
| 2024/0146629 A1 | 5/2024 | Lloyd | |
| 2024/0157837 A1* | 5/2024 | Lee | B60L 53/65 |
| 2024/0195197 A1* | 6/2024 | Bennett | G01R 31/367 |
| 2024/0195206 A1* | 6/2024 | Narula | H02J 7/007108 |
| 2024/0210188 A1* | 6/2024 | Bonekamp | G01C 21/3469 |
| 2024/0221103 A1* | 7/2024 | Ward | G06Q 50/40 |
| 2025/0002033 A1 | 1/2025 | Calmer et al. | |
| 2025/0249781 A1* | 8/2025 | Yang | B60L 58/12 |
| 2025/0296461 A1* | 9/2025 | Bregman | B60L 53/63 |

FOREIGN PATENT DOCUMENTS

| | | | |
|---|---|---|---|
| EP | 1615178 A2 | 1/2006 | |
| GB | 2288892 A | 11/1995 | |
| WO | WO 2017/123665 A1 | 7/2017 | |
| WO | WO 2018/131322 A1 | 7/2018 | |
| WO | WO 2019/099409 A1 | 5/2019 | |
| WO | WO 2019/125545 A1 | 6/2019 | |
| WO | WO 2019/133533 A1 | 7/2019 | |
| WO | WO 2023/244513 A1 | 12/2023 | |

OTHER PUBLICATIONS

"Cargo Monitor", Samsara Inc., accessed Feb. 21, 2024 [publication date unknown], in 2 pages. URL: https://www.samsara.com/products/models/cargo-monitor.

"Connect your operations on the Samsara Platform.", Samsara Inc., [publication date unknown]. URL: https://www.samsara.com/products/platform/?gad_source=1&gclid=EAlaIQobChMI14DWlofYgwMVaymtBh36cwx9EAAYASAAEgKjUfD_BwE#impact1 (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 4 pages.

Driver I, The Power of Vision, Netradyne, [publication date unknown], in 2 pages.

"Driver Scorecards & Fleet Safety" [archived webpage], KeepTruckin, Inc., accessed on Oct. 24, 2023 [archived on Apr. 23, 2019; publication date unknown], in 9 pages. URL: https://web.archive.org/web/20190423104921/https://keeptruckin.com/fleet-safety-and-coaching.

"Driver Speed Management for Fleets—Monitoring Speeding in your fleet to increase safety and lower costs", Lytx, 2018, in 9 pages. URL: https://web.archive.org/web/20181217230050/https://www.lytx.com/en-us/fleet-services/program-enhancements/speed-management-for-fleets.

"Dual-Facing AI Dash Cam—CM32", Samsara Inc., accessed Feb. 7, 2024 [publication date unknown]. URL: https://www.samsara.com/ca/products/models/cm32/ (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 5 pages.

"Eco:Drive™ Social, the community of responsible drivers", Stellantis, Apr. 15, 2014, in 2 pages. URL: https://www.media.stellantis.com/em-en/fiat/press/eco-drive-social-the-community-of-responsible-drivers.

"EcoDrive", Wikipedia, 2022, in 1 page. URL: https://en.wikipedia.org/wiki/EcoDrive.

"ELD Fact Sheet—English Version", Federal Motor Carrier Safety Administration, U.S. Department of Transportation, last updated Oct. 31, 2017 [publication date unknown], in 3 pages. URL: https://www.fmcsa.dot.gov/hours-service/elds/eld-fact-sheet-english-version.

"EM21—Environmental Monitor", Samsara Inc., accessed Feb. 21, 2024 [publication date unknown], in 5 pages. URL: https://www.samsara.com/uk/products/models/em21/.

"Fast Facts: Electronic Logging Device (ELD) Rule", Federal Motor Carrier Safety Administration, U.S. Department of Transportation, Jun. 2017, Document No. FMCSA-ADO-17-003 (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 2 pages.

"Fiat 500—2015 Owner's Manual", FCA US LLC, 2016, 5th ed., in 440 pages.

"Fiat 500 Eco system", Fiat 500 Eco System Forum, Apr. 21, 2020, in 5 pages. URL: https://www.fiat500usaforum.com/forum/fiat-500-forums/fiat-500-general-discussion/32268-fiat-500-eco-system?36406-Fiat-500-Eco-system=.

"Fiat launches EcoDrive for 500 and Grande Punto", Indian Autos Blog, Jul. 10, 2008, in 4 pages. URL: https://indianautosblog.com/fiat-launches-ecodrive-for-500-and-grande-punto-p3049.

"Fiat launches fleet-specific eco:Drive system", Fleet World, 2010, in 3 pages. URL: https://fleetworld.co.uk/fiat-launches-fleet-specific-ecodrive-system/.

"Fleet Dashcam Solution—Vision Mobile App", Fleet Complete, accessed on May 16, 2024 [publication date unknown], in 13 pages. URL: https://www.fleetcomplete.com/products/old-vision-xxxxxx/.

"Fleet Complete Vision Brings Intelligent Video Analytics to Advance Fleet Safety", Fleet Complete, Apr. 5, 2018, in 1 page. URL: https://www.fleetcomplete.com/fleet-complete-vision-brings-intelligent-video-analytics-to-advance-fleet-safety/.

Goodwin, A., "Flats ecoDrive teaches efficient driving", CNET, Oct. 22, 2008, in 5 pages. URL: https://www.cnet.com/roadshow/news/fiats-ecodrive-teaches-efficient-driving/.

"Front-Facing AI Dash Cam—CM31", Samsara Inc., accessed Feb. 7, 2024 [publication date unknown]. URL: https://www.samsara.com/products/models/cm31/ (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 5 pages.

"Fuelopps" [archived webpage], Propel It, archived on Nov. 14, 2017, in 3 pages. URL: https://web.archive.org/web/20171114184116/http://www.propelit.net:80/fuelopps2.

"Fuelopps", Propel It, [publication date unknown], in 1 page. (PROPEL-IT-1393_00001).

"FuelOpps™ Delivers for Covenant Transportation Group—Improved driver behavior contributes to a 3+% MPG improvement in less than 12 months", FuelOpps by Propel IT, [publication date unknown], in 2 pages.

"FuelOpps™ Version 2.0" [presentation], Propel IT, Inc., [publication date unknown], in 17 pages.

"Guide: DRIVE risk score 101", Motive Technologies, Inc., [publication date unknown], Document No. 2022Q2 849898994 (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 22 pages.

"Introduction Pack", Drivecam, Inc., 2012, in 32 pages. URL: https://www.iae-services.com.au/downloads/DriveCam-Introduction-Pack.pdf.

(56)                References Cited

OTHER PUBLICATIONS

"KeepTruckin Expands Hardware Portfolio to Support Fleet Safety and Efficiency—New dual-facing dash camera and asset tracker deliver fleet safety and asset visibility", Business Wire, Sep. 9, 2019, in 4 pages. URL: https://www.businesswire.com/news/home/20190909005517/en/KeepTruckin-Expands-Hardware-Portfolio-to-Support-Fleet-Safety-and-Efficiency.

"KeepTruckin Launches New AI Dashcam Featuring Industry-Leading Accuracy to Proactively Prevent Accidents, Increase Safety and Efficiency", Business Wire, Aug. 12, 2021. URL: https://www.businesswire.com/news/home/20210812005612/en/KeepTruckin-Launches-New-AI-Dashcam-Featuring-Industry-Leading-Accuracy-to-Proactively-Prevent-Accidents-Increase-Safety-and-Efficiency (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 4 pages.

"Lytx DriveCam Program Adds New Client-Centric Enhancements", Mass Transit, Oct. 4, 2016, in 6 pages. URL: https://www.masstransitmag.com/safety-security/press-release/12265105/lytx-lytx-drivecamtm-program-adds-newclient-centric-enhancements-evolving-the-gold-standard-video-telematics-program.

"Lytx Video Services Workspace—Screenshot Key", Lytx, 2017, in 1 page. URL: https://www.multivu.com/players/English/7899252-lytx-video-services-program/docs/KeytoLytx_1505780254680-149005849.pdf.

"Making roads safer for everyone, everywhere", Light Metrics, 2023, in 8 pages. URL: https://www.lightmetrics.co/about-us.

"Map and Tile Coordinates", Google for Developers, last updated Oct. 23, 2023 [retrieved on Oct. 24, 2023], in 5 pages. URL: https://developers.google.com/maps/documentation/javascript/coordinates.

"Meet Return on Traffic Data—The new potential for contextualized transportation analytics", Geotab ITS, accessed on Apr. 1, 2024 [publication date unknown], in 13 pages. URL: https://its.geotab.com/return-on-traffic-data/.

"Mobile Logbook for Drivers" [archived webpage], KeepTruckin, Inc., accessed on Feb. 5, 2024 [archived on Dec. 13, 2013; publication date unknown]. URL: https://web.archive.org/web/20131213071205/https:/keeptruckin.com/ (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 3 pages.

"Motive Announces AI Omnicam, the Industry's First AI-Enabled Camera Built for Side, Rear, Passenger, and Cargo Monitoring", Business Wire, Jun. 15, 2023, in 2 pages. URL: https://www.businesswire.com/news/home/20230615577887/en/Motive-Announces-AI-Omnicam-the-Industry%E2%80%99s-First-AI-Enabled-Camera-Built-for-Side-Rear-Passenger-and-Cargo-Monitoring.

"Nauto—Getting Started", Manualslib, Nauto, Inc., Apr. 20, 2017, in 18 pages. URL: https://www.manualslib.com/manual/1547723/Nauto-Nauto.html.

"Netradyne Adds New Detection Features to Driveri Platform", Automotive Fleet Magazine, Oct. 27, 2016, in 13 pages. URL: https://www.automotive-fleet.com/137445/netradyne-adds-new-detection-features-to-driveri-platform.

"NetraDyne Discuss their AI Platform 5G and their vision of the IoT (Internet of Things)", GSMA, Oct. 3, 2018, in 2 pages. URL: https://www.gsma.com/solutions-and-impact/technologies/internet-of-things/news/netradyne-interview/.

"Netradyne Vision based driver safety solution—Model Name: Driver I, Model No. DRI-128-TMO" [device specification], [publication date unknown], in 4 pages. URL: https://device.report/m/4dd89450078fa688b333692844d3bde954ddfbaf5c105c9d1d42dfd6965cbf1b.pdf.

"NetraDyne, an Artificial Intelligence Leader, Launches Driver-i™, a Vision-Based Platform, Focusing on Commercial Vehicle Driver Safety", Netradyne, [publication date unknown], in 2 pages.

"NetraDyne's Artificial Intelligence Platform Improves Road Safety", Sierra Wireless, Oct. 31, 2016, in 4 pages. URL: https://device.report/m/7d898f1b967fc646a1242d092207719be5da8c6cc9c7daabc63d4a307cfd3dcb.pdf.

"Our Products" [archived webpage], Propel It, archived on Aug. 3, 2018, in 2 pages. URL: https://web.archive.org/web/20180803052120/http://www.propelit.net:80/our-products-1.

"Our Products" [archived webpage], Propel It, archived on Aug. 3, 2018, in 2 pages, URL: https://web.archive.org/web/20180803052120/http://www.propelit.net:80/our-products-1 (MOTIVE-ITC-1393-0024677).

"Our Story", Netradyne, [publication date unknown], (filed in: In the Matter of Certain Vehicle Telematics, Fleet Management, and Video-Based Safety Systems, Devices, and Components thereof, Investigation No. 337-TA-1393, complaint filed Feb. 8, 2024), in 1 page (ND_ITC_0015).

"Product Brief: System Overview", Motive Technologies, Inc., [publication date unknown], Document No. 2022Q4_1203118185166511 (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 3 pages.

"Product Brief: System Overview", Motive Technologies, Inc., [publication date unknown], Document No. 2022Q4_1203118185166511 (referenced in Jan. 24, 2024 Complaint, Case No. 1:24-cv-00084-UNA), in 3 pages. URL: https://gomotive.com/content-library/guides/system-overview/.

"Real-Time GPS Fleet Tracking" [archived webpage], KeepTruckin, Inc., accessed on Oct. 24, 2023 [archived on Apr. 8, 2019; publication date unknown], in 4 pages. URL: https://web.archive.org/web/20190408022059/https:/keeptruckin.com/gps-tracking.

"Safetyopps" [archived webpage], Propel It, archived on Nov. 14, 2017, in 3 pages. URL: https://web.archive.org/web/20171114183538/http://www.propelit.net:80/safetyopps2.

"Safetyopps", Propel It, [publication date unknown], in 1 page. (PROPEL-IT-1393_00019).

"Samsara Vehicle Telematics—Fleet Technology That Goes Beyond GPS Tracking", Fleet Europe, Nexus Communication S.A., Oct. 11, 2022, in 7 pages. URL: https://www.fleeteurope.com/en/connected/europe/features/samsara-vehicle-telematics-fleet-technology-goes-beyond-gps-tracking?t%5B0%5D=Samsara&1%5B1%5D=Telematics&t%5B2%5D=Connectivity&curl=1.

"Sensor Fusion: Building the Bigger Picture of Risk", Lytx, Apr. 12, 2019, in 1 page. URL: https://www.lytx.com/newsletter/sensor-fusion-building-the-bigger-picture-of-risk.

"Smart Dashcam" [archived webpage], KeepTruckin, Inc., accessed on Oct. 24, 2023 [archived on Apr. 8, 2019; publication date unknown], in 8 pages. URL: https://web.archive.org/web/20190408015958/https://keeptruckin.com/dashcam.

"Spec Sheet: AI Dashcam", Motive Technologies, Inc., [publication date unknown], Document No. 2023Q2_1204527643716537 (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 5 pages.

"Spec Sheet: AI Dashcam", Motive Technologies, Inc., [publication date unknown], Document No. 2023Q2_1205736073289732 (referenced in Jan. 24, 2024 Complaint, Case No. 1:24-cv-00084-UNA), in pages. URL: https://gomotive.com/content-library/spec-sheet/ai-dashcam/.

"Spec Sheet: AI Omnicam", Motive Technologies, Inc., [publication date unknown], Document No. 2023Q2_1204519709838862 (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 5 pages.

"Spec Sheet: Smart Dashcam", Motive Technologies, Inc., [publication date unknown], Document No. 2022Q2_911703417 (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 4 pages.

(56) References Cited

OTHER PUBLICATIONS

"Spec Sheet: Vehicle Gateway", Motive Technologies, Inc., [publication date unknown], Document No. 2022Q1_858791278 (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 6 pages.

"Spec Sheet: Vehicle Gateway", Motive Technologies, Inc., [publication date unknown], Document No. 2022Q1_858791278 (referenced in Jan. 24, 2024 Complaint, Case No. 1:24-cv-00084-UNA), in 6 pages. URL: https://gomotive.com/content-library/spec-sheet/vehicle-gateway/.

"The 2012 Fiat 500: eco:Drive", Fiat500USA.com, Feb. 14, 2011, in 24 pages. URL: http://www.fiat500usa.com/2011/02/2012-flat-500-ecodrive.html.

"The World's Smartest 360° Dashcam: Vezo 360—Fast Facts", Arvizon, [publication date unknown], in 7 pages. URL: https://cdn.newswire.com/files/x/5e/13/b92cd7c6259a708e1dfdaa0123c4.pdf.

"What is a ter-a-flop?", netradyne.com, [publication date unknown], in 2 pages.

"Vehicle Gateway", Samsara Inc., [publication date unknown]. URL: https://www.samsara.com/products/models/vehicle-gateway (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 5 pages.

"Vezo 360 Dash Cam—Capture Every Single Angle in Crisp Detail", ArVizon, 2019, in 13 pages. URL: https://www.arvizon.com/vezo-360-dash-cam/.

"Vezo 360, the World's Smartest Dashcam, Keeps You Awake at the Wheel", PR Newswire, Apr. 2, 2019, in 4 pages. URL: https://www.prnewswire.com/news-releases/vezo-360-the-worlds-smartest-dashcam-keeps-you-awake-at-the-wheel-300823457.html.

"The Home of Actionable Transportation Insights—Meet Altitude", Geotab ITS, accessed on Apr. 1, 2024 [publication date unknown], in 5 pages. URL: https://its.geotab.com/altitude/.

"Transform your business with the Connected Operations™ Cloud", Samsara Inc., accessed Feb. 21, 2024 [publication date unknown], in 8 pages. URL: https://www.samsara.com/products/platform/#impact0.

24/7 Staff, "KeepTruckin Raises $18 Million as Silicon Valley Eyes Trucking Industry", Supply Chain 24/7, May 23, 2017. URL: https://www.supplychain247.com/article/keeptruckin_raises_18_million_as_silicon_valley_eyes_trucking_industry/CSA (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 1 page.

Alpert, B., "Deep Learning for Distracted Driving Detection", Nauto, Jan. 15, 2019, in 10 pages. URL: https://www.nauto.com/blog/nauto-engineering-deep-learning-for-distracted-driver-monitoring.

Amazon Web Services, "How Nauto Is Using AI & MI to Build a Data Platform That Makes Driving Safer and Fleets Smarter" [video], YouTube, Apr. 16, 2018, screenshot in 1 page. URL: https://www.youtube.com/watch?v=UtMlrYTmCMU.

Armstrong, C. et al. "Transport Canada Commercial Bus HVEDR Feasibility Study (File No. T8080-160062) Deliverable No. 4", Mecanica Scientific Services Corp, 2018, in 62 pages. URL: https://transcanadahvedr.ca/wp-content/uploads/2022/01/T8080_Deliverable4-DevSmryRpt-FINAL-20180804_English.pdf.

AutoMotoTV, "Flat ecoDrive System" [video], YouTube, Oct. 6, 2008, screenshot in 1 page URL: https://www.youtube.com/watch?v=AUSb2dBBI8E.

Batchelor, B. et al., "Vision Systems on the Internet", Proc. SPIE 6000, Two- and Three-Dimensional Methods for Inspection and Metrology III, Nov. 2005, vol. 600003, in 15 pages.

Bendix Commercial Vehicle Systems LLC, "Bendix launches new Wingman Fusion safety system at Mid-America Trucking Show", OEM Off-Highway, Mar. 25, 2015, in 10 pages. URL: https://www.

oemofthighway.com/electronics/sensors/proximity-detection-safety-systems/press-release/12058015/bendix-launches-new-wingman-fusion-safety-system-at-midamerica-trucking-show.

Bendix, "Bendix® Wingman® Fusion: The Integration of camera, radar, and brakes delivers a new level of performance in North America", Waterstruck.com, 2015, in 10 pages. URL: https://www.waterstruck.com/assets/Bendix-Wingman-Fusion-brochure_Truck-1.pdf.

Bendix, "Quick Reference Catalog", Bendix Commercial Vehicle Systems LLC, 2018, in 165 pages. URL: https://www.bendix.com/media/home/bw1114_us_010.pdf [uploaded in 2 parts].

Bergasa, L. M. et al., "DriveSafe: an App for Alerting Inattentive Drivers and Scoring Driving Behaviors", IEEE Intelligent Vehicles Symposium (IV), Jun. 2014, in 7 pages.

Boodlal, L. et al., "Study of the Impact of a Telematics System on Safe and Fuel-efficient Driving in Trucks", U.S. Department of Transportation, Federal Motor Carrier Safety Administration, Apr. 2014, Report No. FMCSA-13-020, in 54 pages.

Brown, P. et al., "AI Dash Cam Benchmarking" [report], Strategy Analytics, Inc., Apr. 15, 2022, in 27 pages.

Camden, M. et al., "AI Dash Cam Performance Benchmark Testing Final Report", Virginia Tech Transportation Institute, revised Aug. 17, 2023 [submitted Jun. 30, 2023] (filed with Jan. 24, 2024 Complaint, Case No. 1:24-cv-00084-UNA), in 110 pages.

Camden, M. et al., "AI Dash Cam Performance Benchmark Testing Final Report", Virginia Tech Transportation Institute, submitted Jun. 30, 2023 (filed with Jan. 24, 2024 Complaint, Case No. 1:24-cv-00084-UNA), in 109 pages.

Camillo, J., "Machine Vision for Medical Device Assembly", Assembly, Mar. 3, 2015, in 5 pages. URL: https://www.assemblymag.com/articles/92730-machine-vision-for-medical-device-assembly.

Camillo, J., "Machine Vision for Medical Device Assembly", Assembly, Mar. 3, 2015, in 5 pages.

Cetecom, "FCC/IC Test Setup Photos, Intelligent Driving Monitoring System Smart Connected Dash Cam", Cetecom, Inc., Feb. 7, 2018, in 9 pages. URL: https://device.report/m/a68e1abef29f58b699489150a4d27b81f1726ab4f55b3ac98b573a286594dc54.pdf.

Chauhan, V. et al., "A Comparative Study of Machine Vision Based Methods for Fault Detection in an Automated Assembly Machine", Procedia Manufacturing, 2015, vol. 1, pp. 416-428.

Chiou, R. et al., "Manufacturing E-Quality Through Integrated Web-enabled Computer Vision and Robotics", The International Journal of Advanced Manufacturing Technology, Aug. 2009, vol. 43, in 19 pages.

Chiou, R. et al., "Manufacturing E-Quality Through Integrated Web-enabled Computer Vision and Robotics", The International Journal of Advanced Manufacturing Technology, 2009 (published online Oct. 1, 2008), vol. 43, in 11 pages.

Cook, B., "Drivecam: Taking Risk out of Driving, Findings related to In-Cab driver Distraction", Drivecam, 2010, in 50 pages. URL: https://www.fmcsa.dot.gov/sites/fmcsa.dot.gov/files/docs/MCSAC_201006_DriveCam.pdf.

Cordes, C., "Ask an Expert: Capturing Fleet Impact from Telematics", McKinsey & Co., Jun. 13, 2017, in 3 pages. URL: https://www.mckinsey.com/capabilities/operations/our-insights/ask-an-expert-capturing-fleet-impact-from-telematics.

D'Agostino, C. et al., "Learning-Based Driving Events Recognition and Its Application to Digital Roads", IEEE Transactions on Intelligent Transportation Systems, Aug. 2015, vol. 16(4), pp. 2155-2166.

Dillon, A., "User Interface Design", MacMillan Encyclopedia of Cognitive Science, 2003, vol. 4, London: MacMillan, in 18 pages (pp. 453-458). Downloaded from http://hdl.handle.net/10150/105299.

Dillon, A., "User Interface Design", MacMillan Encyclopedia of *Cognitive Science*, 2006, vol. 4, London: MacMillan, in 6 pages (pp. 453-458). Downloaded from https://onlinelibrary.wiley.com/doi/10.1002/0470018860.s00054.

Dunn, B., "What is the Lytx DriveCam?", Autobytel, Jul. 12, 2014, in 1 page. URL: https://www.autobytel.com/what-is-lytx-drivecam.

Ekström, L., "Estimating fuel consumption using regression and machine learning", KTH Royal Institute of Technology, Degree Project in Mathematics, 2018, in 126 pages.

(56) References Cited

OTHER PUBLICATIONS

Engelbrecht, J. et al., "A Survey of Smartphone-based Sensing in Vehicles for ITS Applications", IET Intelligent Transport Systems, Jul. 2015, vol. 9(10), in 23 pages.

Fiat, "Interview to Giorgio Neri: videotutorial eco:Drive" [video], YouTube, Dec. 1, 2010, screenshot in 1 page. URL: https://www.youtube.com/watch?v=XRDeHbUimOs&t=27s.

FiatFranco, ""Ciao!"—Flat ecoDrive" [video], YouTube, Sep. 10, 2007, screenshot in 1 page URL: https://www.youtube.com/watch?v=SluE9Zco55c.

Firstnet™ Built with AT&T, "Reliable telematics solution for utility fleets", Fleet Complete, Apr. 25, 2019, in 2 pages. URL: https://www.firstnet.com/content/dam/firstnet/white-papers/firstnet-fleet-complete-utilities.pdf.

Fleet Complete, "Tony Lourakis tests out Fleet Complete Vision—our new video telematics and driver coaching tool" [video], YouTube, Jan. 9, 2019, screenshot in 1 page. URL: https://www.youtube.com/watch?v=3zEY5x5DOY8.

Fleet Equipment Staff, "Lytx announces enhancements to DriveCam system", Fleetequipmentmag.com, Oct. 7, 2016, in 9 pages. URL: https://www.fleetequipmentmag.com/lytx-drivecam-system-truck-telematics/.

Gallagher, J., "KeepTruckin's AI Focus driving down costs for customers", FreightWaves, Dec. 9, 2019, in 4 pages. URL: https://www.freightwaves.com/news/ai-focus-vaults-keeptruckin-higher-on-freighttech-25-list.

Geraci, B., "It's been one year since we launched the Motive AI Dashcam. See how it's only gotten better.", Motive Technologies, Inc., Oct. 13, 2022, in 5 pages. URL: https://gomotive.com/blog/motive-ai-dashcam-year-one/.

Gilman, E. et al., "Personalised assistance for fuel-efficient driving", Transportation Research Part C, Mar. 2015, pp. 681-705.

Ginevra2008, "Fiat EcoDrive" [video], YouTube, Mar. 7, 2008, screenshot in 1 page. URL: https://www.youtube.com/watch?v=D95p9Bljr90.

Goncalves, J. et al., "Smartphone Sensor Platform to Study Traffic Conditions and Assess Driving Performance", 17th International IEEE Conference on Intelligent Transportation Systems (ITSC), Oct. 2014, in 6 pages.

Green, A., "Logistics Disruptors: Motive's Shoaib Makani on AI and automation", McKinsey & Company, Sep. 6, 2022, in 7 pages. URL: https://www.mckinsey.com/industries/travel-logistics-and-infrastructure/our-insights/logistics-disruptors-motives-shoaib-makani-on-ai-and-automation.

Groover, M. P., Automation, Production Systems, and Computer-Integrated Manufacturing, 2015, 4th Edition, Pearson, in 811 pages.

Groover, M. P., *Automation, Production Systems, and Computer-Integrated Manufacturing*, 2016, 4th Edition (Indian Subcontinent Adaptation), Pearson, in 11 pages.

Hampstead, J. P. "Lightmetrics:an exciting video telematics software startup", FrieghtWaves, Aug. 5, 2018, in 4 pages. URL: https://www.freightwaves.com/news/lightmetrics-exciting-video-telematics-startup.

Han, Z. et al., "Design of Intelligent Road Recognition and Warning System for Vehicles Based on Binocular Vision", IEEE Access, Oct. 2018, vol. 6, pp. 62880-62889.

Hanson, Kelly, "Introducing Motive's Safety Hub for accident prevention and exoneration.", Motive Technologies, Inc., Aug. 18, 2020, in 6 pages. URL: https://gomotive.com/blog/motive-safety-hub/.

Haridas, S., "KeepTruckin Asset Gateway Review", Truck Trailer Tracker, Nov. 16, 2020, in 7 pages. URL: https://trucktrailertracker.com/keeptruckin-asset-gateway-review/.

Haworth, N. et al., "The Relationship between Fuel Economy and Safety Outcomes", Monash University, Accident Research Centre, Dec. 2001, Report No. 188, in 67 pages.

Horowitz, E. "Improve Fleet Safety with Samsara", Samsara Inc., Aug. 25, 2017, in 4 pages. URL: https://www.samsara.com/ca/blog/improve-fleet-safety-with-samsara/.

Horsey, J., "VEZO 360 4K 360 dash cam from $149", Geeky Gadgets, Apr. 3, 2019, in 12 pages. URL: https://www.geeky-gadgets.com/vezo-360-4k-360-dash-cam-03-04-2019/.

Huang, K.-Y. et al., "A Novel Machine Vision System for the Inspection of Micro-Spray Nozzle", Sensors, Jun. 2015, vol. 15(7), pp. 15326-15338.

Huff, A., "Lytx DriveCam", CCJDigital, Apr. 4, 2014, in 12 pages. URL: https://www.ccjdigital.com/business/article/14929274/lytx-drivecam.

Huff, A., "NetraDyne Uses Artificial Intelligence in New Driver Safety Platform", CCJ, Sep. 15, 2016, in 10 pages. URL: https://www.ccjdigital.com/business/article/14933761/netradyne-uses-artificial-intelligence-in-new-driver-safety-platform.

Junior, J. F. et al., "Driver behavior profiling: An investigation with different smartphone sensors and machine learning", PLoS ONE, Apr. 2017, vol. 12(4): e0174959, in 16 pages.

Khan, M., "Why and How We Measure Driver Performance", Medium, Jan. 14, 2020. URL: https://medium.com/motive-eng/why-and-how-we-measure-driver-performance-768d5316fb2c#:~:text=By%20studying%20data%20gathered%20from,the%20driver%20a%20safety%20score (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 8 pages.

Kinney, J., "Timeline of the ELD Mandate: History & Important Dates", GPS Trackit, May 3, 2017. URL: https://gpstrackit.com/blog/a-timeline-of-the-eld-mandate-history-and-important-dates/ (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 5 pages.

Kwon, Y. J. et al., "Automated Vision Inspection in Network-Based Production Environment", International Journal of Advanced Manufacturing Technology, Feb. 2009, vol. 45, pp. 81-90.

Lan, M. et al., "SmartLDWS: A Robust and Scalable Lane Departure Warning System for the Smartphones", Proceedings of the 12th International IEEE Conference on Intelligent Transportation Systems, Oct. 3-7, 2009, pp. 108-113.

Lekach, S., "Driver safety is 'all talk' with this AI real-time road coach", Mashable, Aug. 3, 2018, in 11 pages. URL: https://mashable.com/article/netradyne-driveri-ai-driver-safety.

Lotan, T. et al., "In-Vehicle Data Recorder for Evaluation of Driving Behavior and Safety", Transportation Research Record Journal of the Transportation Research Board, Jan. 2006, in 15 pages.

Lytx, "TeenSafe Driver Program", American Family Insurance®, 2014, in 10 pages. URL: https://online-sd02.drivecam.com/Downloads/TSD_WebsiteGuide.pdf.

Malamas, Elias N. et al. "A survey on industrial vision systems, applications and tools", Image and Vision Computing, Dec. 28, 2002, vol. 21, pp. 171-188.

Meiring, G. et al., "A Review of Intelligent Driving Style Analysis Systems and Related Artificial Intelligence Algorithms", Sensors, Dec. 2015, vol. 15, pp. 30653-30682.

Mitrovic, D. et al., "Reliable Method for Driving Events Recognition", IEEE Transactions on Intelligent Transportation Systems, Jun. 2005, vol. 6(2), pp. 198-205.

Motive Help Center, "*New Fleet Managers Start Here*—Getting Started with Motive for Fleet Managers", Motive Technologies, Inc., accessed on Oct. 24, 2023 [publication date unknown], in 2 pages. URL: https://helpcenter.gomotive.com/hc/en-us/articles/6162442580893--New-Fleet-Managers-Start-Here-Getting-Started-with-Motive-for-Fleet-Managers.

Motive Help Center, "How to add a vehicle on the Fleet Dashboard", Motive Technologies, Inc., accessed on Oct. 25, 2023 [publication date unknown], in 6 pages. URL: https://helpcenter.gomotive.com/hc/en-us/articles/6208623928349.

Motive Help Center, "How to assign an Environmental Sensor to Asset Gateway", Motive Technologies, Inc., accessed on Oct. 24, 2023 [publication date unknown], in 11 pages. URL: https://helpcenter.gomotive.com/hc/en-us/articles/6908982681629.

Motive Help Center, "How to create a Geofence", Motive Technologies, Inc., accessed on Oct. 24, 2023 [publication date unknown],

(56)          References Cited

OTHER PUBLICATIONS in 5 pages. URL: https://helpcenter.gomotive.com/hc/en-us/articles/6162211436061-How-to-create-a-Geofence.

Motive Help Center, "How to create Alert for Geofence", Motive Technologies, Inc., accessed on Oct. 24, 2023 [publication date unknown], in 10 pages. URL: https://helpcenter.gomotive.com/hc/en-us/articles/6190688664733-How-to-create-Alert-for-Geofence.

Motive Help Center, "How to enable Dashcam In-cab Alerts for a Vehicle?", Motive Technologies, Inc., accessed on Feb. 7, 2024 [publication date unknown]. URL: https://helpcenter.gomotive.com/hc/en-us/articles/11761978874141-How-to-enable-Dashcam-In-cab-Alerts-for-a-Vehicle (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 3 pages.

Motive Help Center, "How to enable Event Severity", Motive Technologies, Inc., accessed on Oct. 24, 2023 [publication date unknown], in 3 pages. URL: https://helpcenter.gomotive.com/hc/en-us/articles/7123375017757-How-to-enable-Event-Severity.

Motive Help Center, "How to enable In-Cab audio alerts on the Motive Fleet Dashboard", Motive Technologies, Inc., accessed on Oct. 25, 2023 [publication date unknown], in 4 pages. URL: https://helpcenter.gomotive.com/hc/en-us/articles/6176882285469.

Motive Help Center, "How to Install Environmental Sensors", Motive Technologies, Inc., accessed on Oct. 24, 2023 [publication date unknown], in 4 pages. URL: https://helpcenter.gomotive.com/hc/en-us/articles/6907777171613.

Motive Help Center, "How to Manage a Group and Sub-groups", Motive Technologies, Inc., accessed on Oct. 24, 2023 [publication date unknown], in 4 pages. URL: https://helpcenter.gomotive.com/hc/en-us/articles/6189047187997-How-to-Manage-A-Group-and-Sub-groups.

Motive Help Center, "How to manage Fuel Hub Vehicle Details", Motive Technologies, Inc., accessed on Oct. 24, 2023 [publication date unknown], in 5 pages. URL: https://helpcenter.gomotive.com/hc/en-us/articles/6190039573789-How-to-manage-Fuel-Hub-Vehicle-Details.

Motive Help Center, "How to modify/ set up custom safety events thresholds", Motive Technologies, Inc., accessed on Oct. 24, 2023 [publication date unknown], in 4 pages. URL: https://helpcenter.gomotive.com/hc/en-us/articles/6162556676381-How-to-set-up-Custom-Safety-Event-Thresholds-for-vehicles.

Motive Help Center, "How to monitor Fleet's Speeding behavior", Motive Technologies, Inc., accessed on Oct. 24, 2023 [publication date unknown], in 4 pages. URL: https://helpcenter.gomotive.com/hc/en-us/articles/6189068876701-How-to-monitor-fleet-s-Speeding-behavior.

Motive Help Center, "How to recall/request video from the Motive Fleet Dashboard?", Motive Technologies, Inc., accessed on Oct. 25, 2023 [publication date unknown], in 7 pages. URL: https://helpcenter.gomotive.com/hc/en-us/articles/6162075219229-How-to-recall-request-video-from-the-Motive-Dashcam.

Motive Help Center, "How to record Hours of Service (HOS) with Vehicle Gateway", Motive Technologies, Inc., accessed on Oct. 24, 2023 [publication date unknown], in 3 pages. URL: https://helpcenter.gomotive.com/hc/en-us/articles/6162505072157-How-to-record-Hours-of-Service-HOS-with-Vehicle-Gateway.

Motive Help Center, "How to set a custom Speed Limit", Motive Technologies, Inc., accessed on Oct. 24, 2023 [publication date unknown], in 5 pages. URL: https://helpcenter.gomotive.com/hc/en-us/articles/8866852210205-How-to-set-a-custom-Speed-Limit.

Motive Help Center, "How to Set Real-Time Speeding Alerts on the Fleet Dashboard", Motive Technologies, Inc., accessed on Oct. 24, 2023 [publication date unknown], in 7 pages. URL: https://helpcenter.gomotive.com/hc/en-us/articles/6175738246557-How-to-Set-Real-Time-Speeding-Alerts-on-the-Fleet-Dashboard.

Motive Help Center, "How to set up Custom Safety Event Thresholds for vehicles", Motive Technologies, Inc., accessed on Mar. 13, 2023 [publication date unknown], in 6 pages. URL: https://helpcenter.

gomotive.com/hc/en-us/articles/6162556676381-How-to-set-up-Custom-Safety-Event-Thresholds-for-vehicles.

Motive Help Center, "How to track vehicle speed from the Motive Fleet Dashboard", Motive Technologies, Inc., accessed on Oct. 24, 2023 [publication date unknown], in 4 pages. URL: https://helpcenter.gomotive.com/hc/en-us/articles/6189043119261-How-to-track-vehicle-speed-from-the-Motive-Fleet-Dashboard.

Motive Help Center, "How to unpair and repair Environmental Sensors", Motive Technologies, Inc., accessed on Oct. 24, 2023 [publication date unknown], in 3 pages. URL: https://helpcenter.gomotive.com/hc/en-us/articles/6905963506205-How-to-unpair-and-repair-Environmental-Sensors.

Motive Help Center, "How to view a Safety Event", Motive Technologies, Inc., accessed on Oct. 25, 2023 [publication date unknown], in 4 pages. URL: https://helpcenter.gomotive.com/hc/en-us/articles/6189410468509-How-to-view-a-Safety-Event.

Motive Help Center, "How to view Fleet DRIVE Score Report on Fleet Dashboard", Motive Technologies, Inc., accessed on Feb. 7, 2024 [publication date unknown]. URL: https://helpcenter.gomotive.com/hc/en-us/articles/13200798670493-How-to-view-Fleet-DRIVE-Score-Report-on-Fleet-Dashboard (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 2 pages.

Motive Help Center, "How to view Fuel Hub Driver Details", Motive Technologies, Inc., [publication date unknown]. URL: https://helpcenter.gomotive.com/hc/en-us/articles/6173246145053-How-to-view-Fuel-Hub-Driver-Details (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 5 pages.

Motive Help Center, "How to view Fuel Hub Driver Details", Motive Technologies, Inc., accessed on Oct. 24, 2023 [publication date unknown], in 7 pages. URL: https://helpcenter.gomotive.com/hc/en-us/articles/6173246145053-How-to-view-Fuel-Hub-Driver-Details.

Motive Help Center, "How to view Group DRIVE Score Report on Fleet Dashboard", Motive Technologies, Inc., accessed on Feb. 7, 2024 [publication date unknown]. URL: https://helpcenter.gomotive.com/hc/en-us/articles/12743858622365-How-to-view-Group-DRIVE-Score-Report-on-Fleet-Dashboard (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 2 pages.

Motive Help Center, "How to view safety events report", Motive Technologies, Inc., accessed on Oct. 24, 2023 [publication date unknown], in 2 pages. URL: https://helpcenter.gomotive.com/hc/en-us/articles/6190647741853-How-to-view-safety-events-report.

Motive Help Center, "How to view Stop Sign Violation events on Fleet Dashboard", Motive Technologies, Inc., accessed on Feb. 7, 2024 [publication date unknown]. URL: https://helpcenter.gomotive.com/hc/en-us/articles/6163732277917-How-to-view-Stop-Sign-Violation-events-on-Fleet-Dashboard (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 2 pages.

Motive Help Center, "How to view Stop Sign Violation events on Fleet Dashboard", Motive Technologies, Inc., accessed on Oct. 24, 2023 [publication date unknown], in 2 pages. URL: https://helpcenter.gomotive.com/hc/en-us/articles/6163732277917-How-to-view-Stop-Sign-Violation-events-on-Fleet-Dashboard.

Motive Help Center, "How to view the Driver DRIVE Score Report", Motive Technologies, Inc., accessed on Feb. 7, 2024 [publication date unknown]. URL: https://helpcenter.gomotive.com/hc/en-us/articles/13200710733853-How-to-view-the-Driver-DRIVE-Score-Report (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 2 pages.

Motive Help Center, "How to view the Safety Hub and DRIVE Score details in the DriverApp", Motive Technologies, Inc., accessed on Oct. 24, 2023 [publication date unknown], in 5 pages. URL:

(56) References Cited

OTHER PUBLICATIONS https://helpcenter.gomotive.com/hc/en-us/articles/6162215453853-How-to-view-safety-events-and-Dashcam-videos-on-Motive-App.

Motive Help Center, "How to view your vehicle's Utilization details", Motive Technologies, Inc., accessed on Feb. 7, 2024 [publication date unknown]. URL: https://helpcenter.gomotive.com/hc/en-us/articles/6176914537373-How-to-view-your-vehicle-s-Utilization-details (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 3 pages.

Motive Help Center, "Viewing Close Following Events on the Motive Fleet Dashboard", Motive Technologies, Inc., accessed on Oct. 24, 2023 [publication date unknown], in 7 pages. URL: https://helpcenter.gomotive.com/hc/en-us/articles/6189574616989-Viewing-Close-Following-Events-on-the-Motive-Fleet-Dashboard.

Motive Help Center, "What are Alert Types?", Motive Technologies, Inc., accessed on Oct. 24, 2023 [publication date unknown], in 3 pages. URL: https://helpcenter.gomotive.com/hc/en-us/articles/8239240188957-What-are-Alert-Types-.

Motive Help Center, "What are Environmental Sensors?", Motive Technologies, Inc., accessed on Oct. 24, 2023 [publication date unknown], in 4 pages. URL: https://helpcenter.gomotive.com/hc/en-us/articles/6907551525661-What-are-Environmental-Sensors-.

Motive Help Center, "What are safety risk tags?", Motive Technologies, Inc., accessed on Feb. 21, 2024 [publication date unknown], in 4 pages. URL: https://helpcenter.gomotive.com/hc/en-us/articles/6163713841053.

Motive Help Center, "What are the definitions of safety behaviors triggered by Motive's AI & Smart Dashcams", Motive Technologies, Inc., accessed on Mar. 13, 2023 [publication date unknown], in 3 pages. URL: https://helpcenter.gomotive.com/hc/en-us/articles/8218103926941-What-are-the-definitions-of-safety-behaviors-triggered-by-Motive-s-AI-Smart-Dashcams.

Motive Help Center, "What are the definitions of safety behaviors triggered by Motive's AI & Smart Dashcams", Motive Technologies, Inc., accessed on Oct. 24, 2023 [publication date unknown], in 3 pages. URL: https://helpcenter.gomotive.com/hc/en-us/articles/8218103926941-What-are-the-definitions-of-safety-behaviors-triggered-by-Motive-s-AI-Smart-Dashcams.

Motive Help Center, "What are unsafe behaviors?", Motive Technologies, Inc., accessed on Mar. 13, 2023 [publication date unknown], in 4 pages. URL (archived version): https://web.archive.org/web/20230203093145/https://helpcenter.gomotive.com/hc/en-us/articles/6858636962333-What-are-unsafe-behaviors-.

Motive Help Center, "What are Vehicle Gateway Malfunctions and Data Diagnostics", Motive Technologies, Inc., accessed on Oct. 24, 2023 [publication date unknown], in 4 pages. URL: https://helpcenter.gomotive.com/hc/en-us/articles/6160848958109-What-are-Vehicle-Gateway-Malfunctions-and-Data-Diagnostics.

Motive Help Center, "What is DRIVE Risk Score?", Motive Technologies, Inc., accessed on Oct. 24, 2023 [publication date unknown], in 5 pages. URL: https://helpcenter.gomotive.com/hc/en-us/articles/6162164321693-What-is-DRIVE-risk-score-.

Motive Help Center, "What is DRIVE Risk Score?", Motive Technologies, Inc., accessed on Oct. 24, 2023 [publication date unknown]. URL: https://helpcenter.gomotive.com/hc/en-us/articles/6162164321693-What-Is-DRIVE-risk-score- (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 5 pages.

Motive Help Center, "What is Event Severity?", Motive Technologies, Inc., accessed on Oct. 24, 2023 [publication date unknown], in 3 pages. URL: https://helpcenter.gomotive.com/hc/en-us/articles/6176003080861-What-is-Event-Severity-.

Motive Help Center, "What is Fuel Hub?", Motive Technologies, Inc., accessed on Feb. 5, 2024 [publication date unknown]. URL: https://helpcenter.gomotive.com/hc/en-us/articles/6161577899165-What-is-Fuel-Hub (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 9 pages.

Motive Help Center, "What is Fuel Hub?", Motive Technologies, Inc., accessed on Oct. 24, 2023 [publication date unknown], in 9 pages. URL: https://helpcenter.gomotive.com/hc/en-us/articles/6161577899165-What-is-Fuel-Hub-.

Motive Help Center, "What is Motive Fleet App?", Motive Technologies, Inc., accessed on Oct. 24, 2023 [publication date unknown], in 12 pages. URL: https://helpcenter.gomotive.com/hc/en-us/articles/6113996661917-What-is-Motive-Fleet-App-.

Motive Help Center, "What is Safety Hub?", Motive Technologies, Inc., accessed on Oct. 24, 2023 [publication date unknown], in 10 pages. URL: https://helpcenter.gomotive.com/hc/en-us/articles/6162472353053-What-is-Safety-Hub-.

Motive Help Center, "What Motive fuel features are available?", Motive Technologies, Inc., accessed on Oct. 24, 2023 [publication date unknown], in 2 pages. URL: https://helpcenter.gomotive.com/hc/en-us/articles/6189158796445-What-Motive-fuel-features-are-available-.

Motive Help Center, "What unsafe behaviors does Motive monitor through Dashcam and Vehicle Gateway?", Motive Technologies, Inc., accessed on Feb. 21, 2024 [publication date unknown], in 5 pages. URL: https://helpcenter.gomotive.com/hc/en-us/articles/6858636962333-What-unsafe-behaviors-does-Motive-monitor-through-Dashcam-and-Vehicle-Gateway-#01HCB72T2EXXW3FFVJ1XSDEG77.

Motive Help Center, "What unsafe behaviors does Motive monitor through Dashcam and Vehicle Gateway?", Motive Technologies, Inc., accessed on Oct. 25, 2023 [publication date unknown], in 4 pages. URL: https://helpcenter.gomotive.com/hc/en-us/articles/6858636962333-What-are-unsafe-behaviors-.

Motive, "AI dash cam comparison: Motive, Samsara, Lytx", Motive Technologies, Inc., [publication date unknown]. URL: https://gomotive.com/products/dashcam/fleet-dash-cam-comparison/#seat-belt-use (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 9 pages.

Motive, "AI dash cam comparison: Motive, Samsara, Lytx", Motive Technologies, Inc., accessed on Feb. 18, 2024 [publication date unknown], in 20 pages. URL: https://gomotive.com/products/dashcam/fleet-dash-cam-comparison/.

Motive, "Asset Gateway Installation Guide | Cable/Vehicle Powered" [video], YouTube, Jun. 25, 2020, screenshot in 1 page. URL: https://www.youtube.com/watch?v=pME-VMauQgY.

Motive, "Asset Gateway Installation Guide | Solar Powered" [video], YouTube, Jun. 25, 2020, screenshot in 1 page. URL: https://www.youtube.com/watch?v=jifKM3GT6Bs.

Motive, "Benchmarking AI Accuracy for Driver Safety" [video], YouTube, Apr. 21, 2022, screenshot in 1 page. URL: https://www.youtube.com/watch?v=brRt2h0J80E.

Motive, "CEO Shoaib Makani's email to Motive employees.", Motive Technologies, Inc., Dec. 7, 2022, in 5 pages. URL: https://gomotive.com/blog/shoalb-makanis-message-to-employees/.

Motive, "Coach your drivers using the Motive Safety Hub." [video], YouTube, Mar. 27, 2023, screenshot in 1 page. URL: https://www.youtube.com/watch?v=VeErPXF30js.

Motive, "Equipment and trailer monitoring", Motive Technologies, Inc., accessed on Feb. 18, 2024 [publication date unknown], in 11 pages. URL: https://gomotive.com/products/tracking-telematics/trailer-tracking/.

Motive, "Experts agree, Motive is the most accurate, fastest AI dash cam.", Motive Technologies, Inc., accessed Feb. 21, 2024 [publication date unknown] in 16 pages. URL; https://gomotive.com/products/dashcam/best-dash-cam/.

Motive, "Guide: AI Model Development", Motive Technologies, Inc., accessed on Mar. 29, 2024 [publication date unknown], Document No. 2022Q1_849898994, in 14 pages.

Motive, "Guide: DRIVE risk score", Motive Technologies, Inc., accessed on Apr. 8, 2023 [publication date unknown], Document No. 2022Q2_849898994, in 22 pages.

(56) References Cited

OTHER PUBLICATIONS

Motive, "Guide: Smart Event Thresholds", Motive Technologies, Inc., accessed on Apr. 8, 2023 [publication date unknown], Document No. 2022Q1_902914404, in 11 pages.

Motive, "How to install a Motive Vehicle Gateway in light-duty vehicles." [video], YouTube, Aug. 5, 2022, screenshot in 1 page. URL: https://www.youtube.com/watch?v=WncIRs_cFw0.

Motive, "How to install your Motive AI Dashcam." [video], YouTube, Aug. 5, 2022, screenshot in 1 page. URL: https://www.youtube.com/watch?v=3JNG2h3KnU4.

Motive, "IFTA fuel tax reporting", Motive Technologies, Inc., accessed on Feb. 18, 2024 [publication date unknown], in 4 pages. URL: https://gomotive.com/products/fleet-compliance/ifta-fuel-tax-reporting/.

Motive, "Improve road and fleet safety with driver scores.", Motive Technologies, Inc., Feb. 7, 2019, in 5 pages. URL: https://gomotive.com/blog/improve-fleet-safety-driver-scores/.

Motive, "Industry-leading fleet management solutions", Motive Technologies, Inc., accessed on Feb. 18, 2024 [publication date unknown], in 13 pages. URL: https://gomotive.com/products/.

Motive, "Introducing an easier way to manage unidentified trips.", Motive Technologies, Inc., Apr. 30, 2020, in 5 pages. URL: https://gomotive.com/blog/introducing-easier-ude-management/.

Motive, "Introducing Motive Driver Workflow.", Motive Technologies, Inc., Oct. 16, 2017, in 5 pages. URL: https://gomotive.com/blog/motive-driver-workflow/.

Motive, "Introducing the Motive Asset Gateway and dual-facing Smart Dashcam.", Motive Technologies, Inc., Sep. 9, 2019, in 5 pages. URL: https://gomotive.com/blog/trailer-tracking-and-dual-facing-dash-cam-introducing/.

Motive, "Introducing the Motive Smart Dashcam", Motive Technologies, Inc., Jun. 6, 2018. URL: https://gomotive.com/blog/announcing-smart-dashcam (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 9 pages.

Motive, "KeepTruckin ELD Training for Drivers" [video], YouTube, Feb. 2, 2018, screenshot in 1 page. URL: https://www.youtube.com/watch?v=LkJLIT2bGS0.

Motive, "KeepTruckin Smart Dashcam" [video], Facebook, Jun. 6, 2018. URL: https://www.facebook.com/keeptrucking/videos/keeptrucking-smart-dashcam/10212841352048331/ (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 3 pages.

Motive, "Motive Fleet View | Advanced GPS system for live and historical fleet tracking." [video], YouTube, Jan. 23, 2023, screenshot in 1 page. URL: https://www.youtube.com/watch?v=CSDIDZhjVOQ.

Motive, "Motive introduces Reefer Monitoring for cold chain logistics.", Motive Technologies, Inc., Oct. 4, 2022, in 5 pages. URL: https://gomotive.com/blog/motive-introduces-reefer-monitoring-for-cold-chain-logistics/.

Motive, "Motive Reefer Monitoring for cold chain logistics." [video], YouTube, Oct. 5, 2022, screenshot in 1 page. URL: https://www.youtube.com/watch?v=rDwS5AmQp-M.

Motive, "Motive Smart Load Board—designed to help you find the right loads faster." [video], YouTube, Nov. 28, 2022, screenshot in 1 page. URL: https://www.youtube.com/watch?v=UF2EQBzLYYk.

Motive, "Motive vs. Samsara: What's the difference?", Motive Technologies, Inc., accessed Feb. 21, 2024 [publication date unknown], in 16 pages. URL: https://gomotive.com/motive-vs-samsara/#compare-chart.

Motive, "No time for downtime—automate fleet maintenance schedules" [video], YouTube, Dec. 20, 2022, screenshot in 1 page. URL: https://www.youtube.com/watch?v=flUccP-ifaU.

Motive, "Product Brief: Driver Safety", Motive Technologies, Inc., accessed on Oct. 24, 2023 [publication date unknown], Document No. 2023Q2_1204527735206670, in 4 pages.

Motive, "Product Brief: System Overview", Motive Technologies, Inc., accessed on Oct. 24, 2023 [publication date unknown], Document No. 2022Q4_1203331000367178, in 4 pages.

Motive, "Product Brief: Tracking & Telematics", Motive Technologies, Inc., accessed on Oct. 24, 2023 [publication date unknown], Document No. 2022Q3_ 1202933457877590, in 4 pages.

Motive, "Products | AI Dashcam—Smart, accurate, and responsive AI dash cams.", Motive Technologies, Inc., [publication date unknown]. URL: https://gomotive.com/products/dashcam/ (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 7 pages.

Motive, "Products | AI Dashcam—Smart, accurate, and responsive AI dash cams.", Motive Technologies, Inc., accessed on Feb. 18, 2024 [publication date unknown], in 9 pages. URL: https://gomotive.com/products/dashcam/.

Motive, "Products | Dispatch—Manage your dispatches with ease.", Motive Technologies, Inc., accessed on Feb. 18, 2024 [publication date unknown], in 9 pages. URL: https://gomotive.com/products/dispatch-workflow/.

Motive, "Products | Driver Safety—Protect your fleet and profits with an all-in-one safety solution.", Motive Technologies, Inc., accessed on Feb. 18, 2024 [publication date unknown], in 13 pages. URL: https://gomotive.com/products/driver-safety/.

Motive, "Products | Driver Safety—Protect your fleet and profits with an all-in-one safety solution.", Motive Technologies, Inc., accessed on Feb. 5, 2024 [publication date unknown]. URL: https://gomotive.com/products/driver-safety/ (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 16 pages.

Motive, "Products | Platform—Everything you need to manage your fleet. In one place.", Motive Technologies, Inc., accessed on Feb. 7, 2024 [publication date unknown]. URL: https://gomotive.com/products/platform/ (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 12 pages.

Motive, "Products | Reefer Monitoring—The strongest link in cold chain transportation.", Motive Technologies, Inc., accessed on Feb. 18, 2024 [publication date unknown], in 8 pages. URL: https://gomotive.com/products/reefer-monitoring-system/.

Motive, "Products | Tracking & Telematics—Track and monitor your fleet.", Motive Technologies, Inc., accessed on Feb. 18, 2024 [publication date unknown], in 11 pages. URL: https://gomotive.com/products/tracking-telematics/.

Motive, "Spec Sheet: AI Dashcam", Motive Technologies, Inc., accessed on Oct. 24, 2023 [publication date unknown], Document No. 2022Q3_1202788858717595, in 5 pages.

Motive, "Spec Sheet: Asset Gateway", Motive Technologies, Inc., accessed on Mar. 15, 2023 [publication date unknown], Document No. 2022Q1_849551229, in 6 pages.

Motive, "Take control of your fleet with Groups and Features Access.", Motive Technologies, Inc., Apr. 4, 2017, in 3 pages. URL: https://gomotive.com/blog/take-control-fleet-groups-features-access/.

Motive, "Take the time and hassle out of IFTA fuel tax reporting with Motive's fleet card." [video], You Tube, Jan. 26, 2023, screenshot in 1 page. URL: https://www.youtube.com/watch?v=OEN9Q8X3j6l.

Motive, "The most accurate AI just got better.", Motive Technologies, Inc., Mar. 8, 2023, in 8 pages. URL: https://gomotive.com/blog/fewer-fleet-accidents-with-the-new-ai/.

Motive, "The Motive Driver App: Change current duty status in your driving log." [video], YouTube, Aug. 10, 2022, screenshot in 1 page. URL: https://www.youtube.com/watch?v=m4HPnM8BLBU.

Motive, "The Motive Driver App: Claim and correct unidentified trips." [video], YouTube, Sep. 13, 2022, screenshot in 1 page. URL: https://www.youtube.com/watch?v=z2_kxd3dRac.

Motive, "The Motive Driver App: Connect to the Vehicle Gateway." [video], YouTube, Sep. 13, 2022, screenshot in 1 page. URL: https://www.youtube.com/watch?v=egZmLYDa3kE.

Motive, "The Motive Driver App: Creating fleet vehicle inspection reports." [video], YouTube, Aug. 10, 2022, screenshot in 1 page. URL: https://www.youtube.com/watch?v=u1JI-rZhbdQ.

(56)  References Cited

OTHER PUBLICATIONS

Motive, "The Motive Driver App: Digitally record hours of service (HOS)." [video], YouTube, Aug. 10, 2022, screenshot in 1 page. URL: https://www.youtube.com/watch?v=gdexlb_zqtE.

Motive, "The Motive Driver App: Insert past duty driving log status." [video], YouTube, Aug. 10, 2022, screenshot in 1 page. URL: https://www.youtube.com/watch?v=TmOipFKPBeY.

Motive, "The Motive Driver App: Switch to DOT inspection mode to share driving logs." [video], YouTube, Aug. 10, 2022, screenshot in 1 page. URL: https://www.youtube.com/watch?v=S2LR1ZUImBU.

Motive, "The Motive Driver App: View hours of service (HOS) violations." [video], YouTube, Aug. 10, 2022, screenshot in 1 page. URL: https://www.youtube.com/watch?v=qJX2ZIBGtV8.

Motive, "U.S. speed limits. What drivers and fleets need to know.", Motive Technologies, Inc., Jan. 13, 2022, in 8 pages. URL: https://gomotive.com/blog/us-speed-limits-for-drivers/.

Motive, "What is an AI dashcam?", Motive Technologies, Inc., Jan. 21, 2022, in 6 pages. URL: https://gomotive.com/blog/what-is-ai-dashcam/.

Motive, "WiFi Hotspot sets you free from restrictive cell phone data plans.", Motive Technologies, Inc., Jun. 27, 2019, in 5 pages. URL: https://gomotive.com/blog/wifi-hotspot/.

Motive, "WiFi Hotspot", Motive Technologies, Inc., accessed on Feb. 18, 2024 [publication date unknown], in 5 pages. URL: https://gomotive.com/products/wifi-hotspot/.

Multivu.com, "Powerful Technology ER-SV2 Event Recorder", Lytx Inc., 2015, in 2 pages. URL: https://www.multivu.com/players/English/7277351-lytx-activevision-distracted-driving/document/52a97b52-6f94-4b11-b83b-8c7d9cef9026.pdf.

Nauto, "How Fleet Managers and Safety Leaders Use Nauto" [video], YouTube, Jan. 25, 2018, screenshot in 1 page. URL: https://www.youtube.com/watch?v=k_iX7a6j2-E.

Nauto, "The New World of Fleet Safety—Event Keynote" [video], YouTube, Jul. 9, 2020, screenshot in 1 page. URL: https://www.youtube.com/watch?v=iMOab9Ow_CY.

Netradyne Inc., "Netradyne Introduces New DriverStar Feature to Recognize and Reward Safe Driving", PR Newswire, Netradyne, Inc., Oct. 19, 2017, in 2 pages. URL: https://www.prnewswire.com/news-releases/netradyne-introduces-new-driverstar-feature-to-recognize-and-reward-safe-driving-300540267.html.

Netradyne India, "Netradyne Driveri Covered in BBC Click" [video], YouTube, Jan. 25, 2018, screenshot in 1 page. URL: https://www.youtube.com/watch?v=jhULDLj9iek.

Netradyne presentation, Netradyne, Oct. 2016, in 23 pages.

Netradyne, "Driver•i™ Catches No Stop ad Stop Sign | Fleet Management Technology" [video], YouTube, Oct. 3, 2017, screenshot in 1 page. URL: https://www.youtube.com/watch?v=l8sX3X02aJo.

Netradyne, "Driver•i™ Flags Commercial Driver Running Red Light—360-degree vi" [video], YouTube, Oct. 3, 2017, screenshot in 1 page. URL: https://www.youtube.com/watch?v=au9_ZNGYCmY.

Netradyne, Driver Card 1, 2018, in 2 pages (ND_ITC_0001-ND_ITC_0002).

Netradyne, Driver Card 2, 2018, in 2 pages (ND_ITC_0003-ND_ITC_0004).

Netradyne, Warnings, [publication date unknown], (filed in: In the Matter of Certain Vehicle Telematics, Fleet Management, and Video-Based Safety Systems, Devices, and Components thereof, Investigation No. 337-TA-1393, complaint filed Feb. 8, 2024), in 2 pages (ND_ITC_0005-ND_ITC_0006).

Ohidan, A., "Fiat and AKQA Launch Eco:Drive™", Science 2.0, Oct. 7, 2008, in 4 pages. URL: https://www.science20.com/newswire/fiat_and_akqa_launch_eco_drive_tm.

Perez, L. et al., "Robot Guidance Using Machine Vision Techniques in Industrial Environments: A Comparative Review", Sensors, Mar. 2016, vol. 16(3), in 27 pages.

Puckett, T. et al. "Safety Track 4B-Driver Risk Management Program", Airports Council International, Jan. 18, 2019, in 29 pages.

URL: https://airportscouncil.org/wp-content/uploads/2019/01/4b-DRIVER-RISK-MANAGEMENT-PROGRAM-Tamika-Puckett-Rob-Donahue.pdf.

Ramkumar, S. M. et al., "Chapter 14 Web Based Automated Inspection and Quality Management", in Web-Based Control and Robotics Education, 2009, ed., Spyros G. Tzafestas, Springer, in 42 pages.

Tzafestas, S. G. (ed.), *Web-Based Control and Robotics Education*, 2009, Springer, ISBN 978-90-481-2504-3, in 362 pages. [uploaded in 3 parts].

Samsara Support, "AI Event Detection", Samsara Inc., accessed on Feb. 7, 2024 [publication date unknown]. URL: https://kb.samsara.com/hc/en-us/articles/360043619011-AI-Event-Detection#UUID-4790b62c-6987-9c06-28fe-c2e2a4fbbb0d (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 3 pages.

Samsara Support, "Alert Configuration", Samsara Inc., accessed Feb. 7, 2024 [publication date unknown]. URL: https://kb.samsara.com/hc/en-us/articles/217296157-Alert-Configuration (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 5 pages.

Samsara Support, "Alert Triggers", Samsara Inc., accessed Feb. 7, 2024 [publication date unknown]. URL: https://kb.samsara.com/hc/en-us/articles/360043113772-Alert-Triggers (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 6 pages.

Samsara Support, "Automatic Driver Detection (Camera ID)", Samsara Inc., accessed on Feb. 7, 2024 [publication date unknown]. URL: https://kb.samsara.com/hc/en-us/articles/360042878172#UUID-294cf192-1216-2c5a-3221-9432288c9b25 (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 3 pages.

Samsara Support, "Dash Cam Recording Logic", Samsara Inc., accessed on Feb. 7, 2024 [publication date unknown]. URL: https://kb.samsara.com/hc/en-us/articles/360011372211-Dash-Cam-Recording-Logic (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 2 pages.

Samsara Support, "Dash Cam Settings Overview", Samsara Inc., accessed on Feb. 7, 2024 [publication date unknown]. URL: https://kb.samsara.com/hc/en-us/articles/360042037572-Dash-Cam-Settings-Overview (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 3 pages.

Samsara Support, "Rolling Stop Detection", Samsara Inc., accessed on Feb. 7, 2024 [publication date unknown]. URL: https://kb.samsara.com/hc/en-us/articles/360029629972-Rolling-Stop-Detection (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 2 pages.

Samsara Support, "Safety Score Categories and Calculation", Samsara Inc., [publication date unknown]. URL: https://kb.samsara.com/hc/en-us/articles/360045237852-Safety-Score-Categoriesand-Calculation (filled with Feb. 8, 2024 ITC Complaint, In the Matter of Certain Vehicle Telematics, Fleet Management, and Video-Based Safety Systems, Devices, and Components thereof, Investigation No. 337-TA-1393), in 3 pages.

Samsara Support, "Safety Score Weights and Configuration", Samsara Inc., accessed Feb. 7, 2024 [publication date unknown]. URL: https://kb.samsara.com/hc/en-us/articles/360043160532-Safety-Score-Weights-and-Configuration#UUID-fcb096dd-79d6-69fc-6aa8-5192c665be0a_sectionidm4585641455801633238429578704 (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 4 pages.

(56) References Cited

OTHER PUBLICATIONS

Samsara, "AI Dash Cams", Samsara, Inc., [publication date unknown] (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 9 pages.

Samsara, "CM31 Dash Camera Datasheet—Internet-Connected Front-Facing HD Camera Module", [publication date unknown] (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 4 pages.

Samsara, "CM32 Dash Camera—Internet-Connected Dual-Facing HD Camera Module", [publication date unknown] (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 2 pages.

Samsara, "Unpowered Asset Tracker AG45 Datasheet", accessed Feb. 21, 2024 [publication date unknown], in 4 pages. URL: https://www.samsara.com/pdf/docs/AG45_Datasheet.pdf.

Samsara, "Vehicle Gateways—VG34, VG54, VG54H Datasheet", [publication date unknown] (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 8 pages.

Sindhu MV, "How this three-year-old Bengaluru startup is helping make US roads safer with its video analytics solutions", Yourstory.com, Mar. 26, 2018, in 7 pages. URL: https://yourstory.com/2018/03/lightmetrics-road-safety-analytics.

Smart Dash Cam Vezo3601, "Vivek Soni Co-Founder at Arvizon" [video], YouTube, Feb. 21, 2019, screenshot in 1 page. URL: https://www.youtube.com/watch?v=1eclwRCb5ZA.

Song, T. et al., "Enhancing GPS with Lane-level Navigation to Facilitate Highway Driving", IEEE Transactions on Vehicular Technology, Jun. 2017 (published on Jan. 30, 2017), vol. 66, No. 6, in 12 pages.

Song, T. et al., "Enhancing GPS with Lane-level Navigation to Facilitate Highway Driving", IEEE Transactions on Vehicular Technology, Jun. 2017 (published on Jan. 30, 2017), vol. 66, No. 6, pp. 4579-4591, in 13 pages.

Soumik Ukil, "LightMetrics ADAS demo" [video], You Tube, Jul. 20, 2017, screenshot in 1 page. URL: https://www.youtube.com/watch?app=desktop&v=9LGz1oo7dTw.

Steger, C. et al., "Chapter 2 Image Acquisition" and "Chapter 3 Machine Vision Algorithms", in Machine Vision Algorithms and Applications, 2018, 2nd ed., Wiley, in 604 pages.

Steger, C. et al., *Machine Vision Algorithms and Applications*, 2018, 2nd ed., Wiley, in 60 pages.

Straight, B. "Over 20 years later, Lytx continues to evolve alongside the industry it serves", FreightWaves, Apr. 16, 2019, in 4 pages. URL: https://www.freightwaves.com/news/technololgy/the-evolution-of-lytx.

Straight, B., "Netradyne using AI to provide intelligent insight into distracted driving", Netradyne, Inc., Nov. 8, 2017, in 4 pages. URL: https://www.freightwaves.com/news/2017/11/7/netradyne-using-ai-to-provide-intelligent-insight-into-distracted-driving.

Su, C.-C. et al., "Bayesian depth estimation from monocular natural images", Journal of Vision, 2017, vol. 17(5):22, pp. 1-29.

Sung, T.-W. et al., "A Speed Control Scheme of Eco-Driving at Road Intersections", 2015 Third International Conference on Robot, Vision and Signal Processing, 2015, pp. 51-54.

Suppose U Drive, "New Trucking Tech: Forward Facing Cameras" supposeudrive.com, Mar. 15, 2019, in pp. 7. URL: https://supposeudrive.com/new-trucking-tech-forward-facing-cameras/.

The Wayback Machine, "AT&T Fleet Complete—Give your Business a competitive advantage", AT&T, 2019, in 12 pages. URL: https://web.archive.org/web/20190406125249/http:/att.fleetcomplete.com/.

The Wayback Machine, "Introducing Driver-I™", NetraDyne, Sep. 22, 2016, in 4 pages URL: https://web.archive.org/web/20160922034006/http://www.netradyne.com/solutions.html.

The Wayback Machine, "NetraDyne's Driver-I™ platform delivers results beyond legacy safety video systems Counting safe driving as safe driving—taking second-guessing out of commercial fleet driver safety", NetraDyne, Feb. 9, 2018, in 7 pages. URL: https://web.archive.org/web/20180209192736/http:/netradyne.com/solutions/.

Top Fives, "15 Biggest Data Centers on Earth" [video], YouTube, Jun. 9, 2024, screenshot in 1 page. URL: https://www.youtube.com/watch?v=1LmFmCVTppo.

Uliyar, M., "LightMetrics' RideView video safety system provides the best ROI", Linkedin, Sep. 8, 2016, in 4 pages URL: https://www.linkedin.com/pulse/lightmetrics-rideview-video-safety-system-provides-best-mithun-uliyar/.

Vezo 360, "World's Smartest Dash Cam Powered by AI" [video], YouTube, Mar. 31, 2019, screenshot in 1 page. URL: https://www.youtube.com/watch?v=M5r5wZozS0E.

Vlahogianni, E. et al., "Driving analytics using smartphones: Algorithms, comparisons and challenges", Transportation Research Part C, Jun. 2017, vol. 79, pp. 196-206.

Wahlstrom, J. et al., "Smartphone-based Vehicle Telematics—A Ten-Year Anniversary", IEEE Transactions on Intelligent Transportation Systems, Nov. 2016, vol. 18(10), in 23 pages.

Wu, S., "Motivating High-Performing Fleets with Driver Gamification", Samsara, Feb. 2, 2018, in 4 pages. URL: https://www.samsara.com/blog/motivating-high-performing-fleets-with-driver-gamification/.

Yufeng, Z. et al., "3G-Based Specialty Vehicles Real-Time Monitoring System", Applied Mechanics and Materials, Feb. 2014, vols. 513-517, pp. 871-875.

Yufeng, Z. et al., "3G-Based Specialty Vehicles Real-Time Monitoring System", Applied Mechanics and Materials, Feb. 2014, vols. 513-517, pp. 871-875, in 7 pages.

Zanini, M. et al., "Mobile Assets Monitoring for Fleet Maintenance", SAE International, Apr. 11-14, 2005, in 9 pages.

Zanini, M. et al., "Mobile Assets Monitoring for Fleet Maintenance", SAE International, 2005, pp. 369-375, in 8 pages.

Zhong, R. Y. et al., "Intelligent Manufacturing in the Context of Industry 4.0: A Review", Engineering, Oct. 2017, vol. 3, Issue 5, pp. 616-630.

* cited by examiner

320

Fuel & Energy Settings

Eco-Driving    Fuel Cards    Vehicle Fuel Types    Fuel Cost    Charge Control    Fuel Purchases

Charge Profiles

402 — [ + Create Profile ]

Default
Last updated 19 days ago

Applied to 125 vehicles ✎

| Charge Level | Target Charge 80% | Low Charge Level 20% |
| --- | --- | --- |
| Charge Schedule | Scheduled Charge Start Inactive | Scheduled Departure Inactive |

410

BUS
Last updated 19 days ago

Applied to 3 vehicles ✎

| Charge Level | Target Charge 80% | Low Charge Level 30% |
| --- | --- | --- |
| Charge Schedule | Scheduled Charge Start Inactive | Scheduled Departure Inactive |

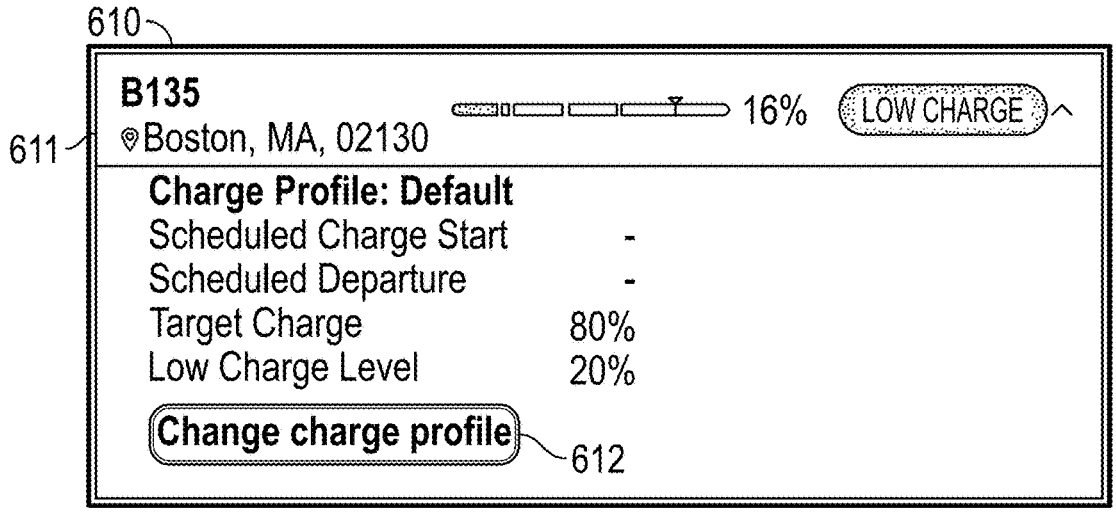

611

B135
⦿Boston, MA, 02130    16%    LOW CHARGE ∧

Charge Profile: Default
Scheduled Charge Start    -
Scheduled Departure    -
Target Charge    80%
Low Charge Level    20%
Change charge profile    612

B225
⦿Boston, MA, 02130    98%    COMPLETE ∧

613

Charge Schedule : Default
Scheduled Charge Start    -
Scheduled Departure    -
Target Charge    80%
Low Charge Level    20%
Change charge profile

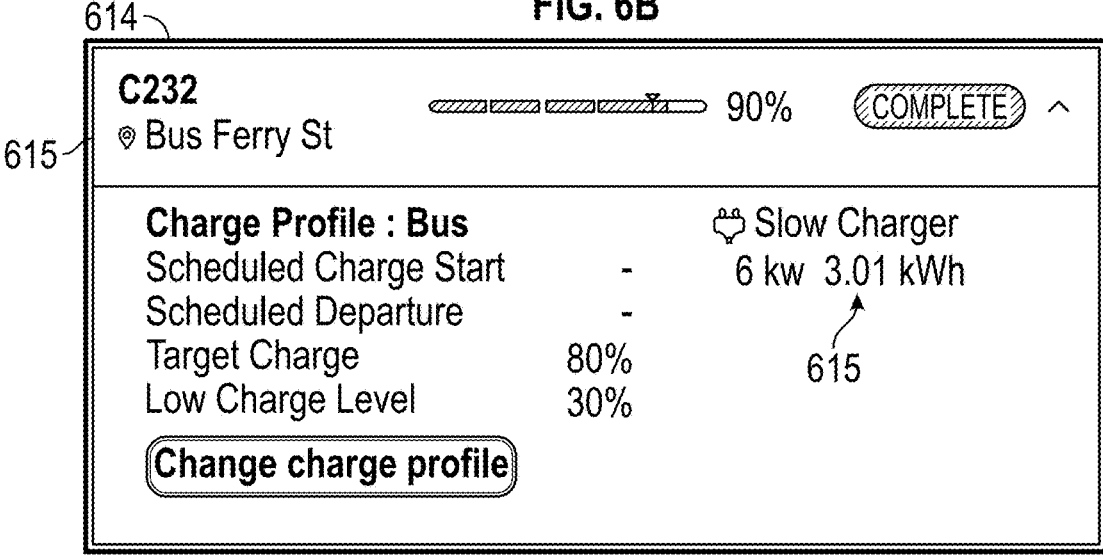

615

C232
⦿ Bus Ferry St    90%    COMPLETE ∧

Charge Profile : Bus    🔌 Slow Charger
Scheduled Charge Start    -    6 kw  3.01 kWh
Scheduled Departure    -
Target Charge    80%    615
Low Charge Level    30%
Change charge profile

FIG. 6C

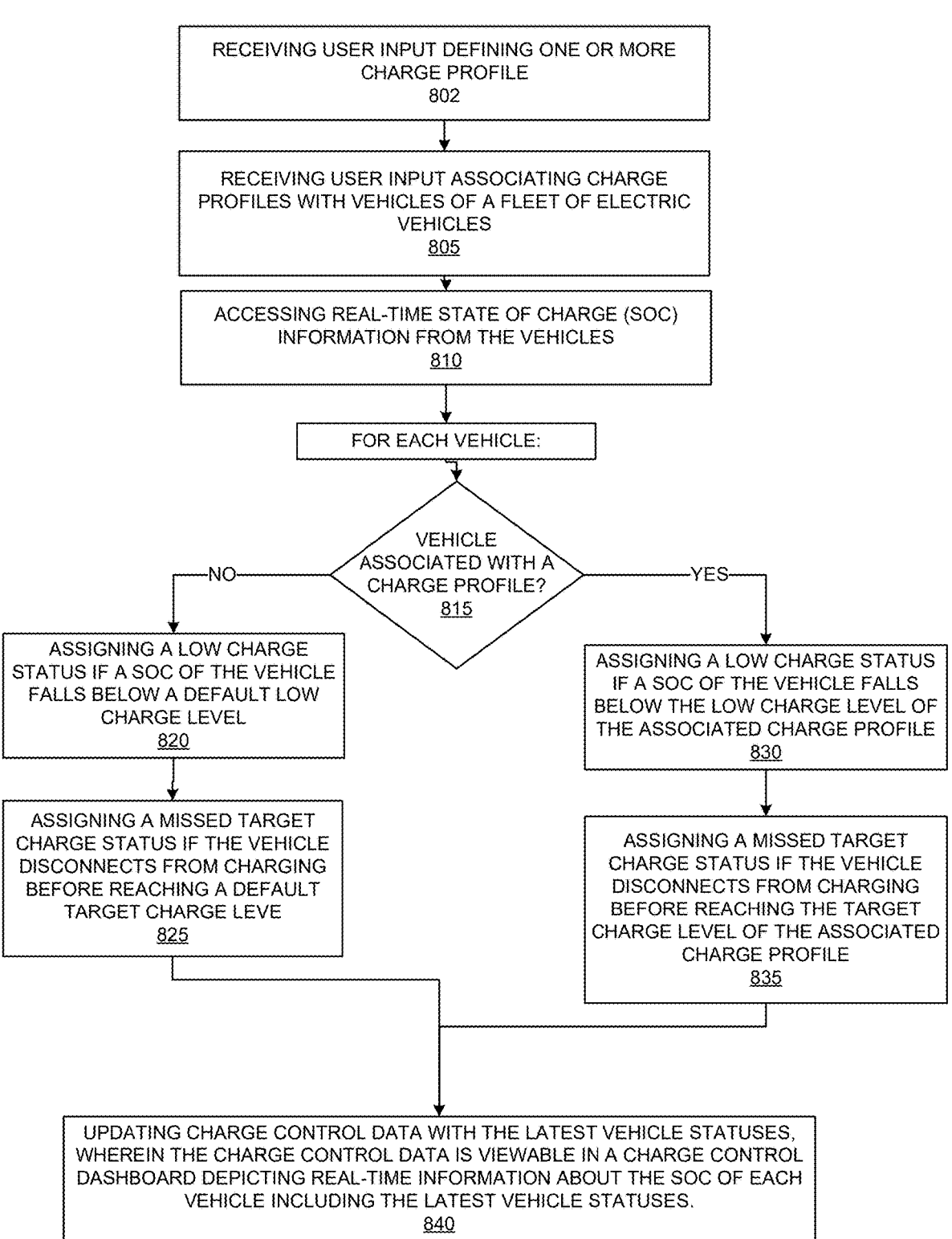

RECEIVING USER INPUT DEFINING ONE OR MORE
CHARGE PROFILE
802

RECEIVING USER INPUT ASSOCIATING CHARGE
PROFILES WITH VEHICLES OF A FLEET OF ELECTRIC
VEHICLES
805

ACCESSING REAL-TIME STATE OF CHARGE (SOC)
INFORMATION FROM THE VEHICLES
810

FOR EACH VEHICLE:

VEHICLE
ASSOCIATED WITH A
CHARGE PROFILE?
815

NO

YES

ASSIGNING A LOW CHARGE
STATUS IF A SOC OF THE VEHICLE
FALLS BELOW A DEFAULT LOW
CHARGE LEVEL
820

ASSIGNING A LOW CHARGE STATUS
IF A SOC OF THE VEHICLE FALLS
BELOW THE LOW CHARGE LEVEL OF
THE ASSOCIATED CHARGE PROFILE
830

ASSIGNING A MISSED TARGET
CHARGE STATUS IF THE VEHICLE
DISCONNECTS FROM CHARGING
BEFORE REACHING A DEFAULT
TARGET CHARGE LEVE
825

ASSIGNING A MISSED TARGET
CHARGE STATUS IF THE VEHICLE
DISCONNECTS FROM CHARGING
BEFORE REACHING THE TARGET
CHARGE LEVEL OF THE ASSOCIATED
CHARGE PROFILE
835

UPDATING CHARGE CONTROL DATA WITH THE LATEST VEHICLE STATUSES,
WHEREIN THE CHARGE CONTROL DATA IS VIEWABLE IN A CHARGE CONTROL
DASHBOARD DEPICTING REAL-TIME INFORMATION ABOUT THE SOC OF EACH
VEHICLE INCLUDING THE LATEST VEHICLE STATUSES.
840

FIG. 8

CHARGE CONTROL

TECHNICAL FIELD

Implementations of the present disclosure relate to charge management of a fleet of electronic vehicles.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The task of managing charging for electric vehicles (EVs) is a significant challenge in the operation of such vehicles. Due to the lengthy charge times, which can last several hours, fleet managers must ensure that EVs have enough charge to successfully complete their assigned routes or shifts. Effective charge management is essential to maintain the smooth functioning and productivity of an EV fleet.

SUMMARY

The systems, methods, and devices described herein each have several aspects, no single one of which is solely responsible for its desirable attributes. Without limiting the scope of this disclosure, several non-limiting features will now be described briefly.

As the transition to electric vehicles (EVs) progresses, depot/fleet managers and drivers must adapt their daily routines to accommodate the necessary charging times for these vehicles. It is important that EVs are charged to the required level at specified intervals to maintain operational smoothness. If a driver fails to plug in an EV or if a charger malfunctions during a charging session, fleet managers may not become aware of the issue until several hours later or, even worse, only discover the problem when it is time for the vehicle to depart for its next assignment.

As fleets expand and increase the number of EVs and drivers, real-time charge monitoring becomes important due to the impracticality of manual charge monitoring for these large fleets. "Charge Control," as may be used herein, generally describes the functionality and/or hardware that is implemented to provide the various fleet management functions related to monitoring and/or managing charging of EVs. In some implementations, certain Charge Control functions are performed by a Backend, such as a fleet management system (that may include a charge monitoring system), a charge control dashboard (e.g., that is viewed by a fleet manager) and/or gateways or other devices associated with EVs.

A charge monitoring system may be configured to detect issues related to EV charging and battery levels in real-time so that they may be proactively addressed. For example, if a vehicle's charge level drops to a critically low level, the fleet manager can contact the driver to ensure they have a plan in place to reach a nearby charging station. In emergency situations, the charge monitoring system could even assist the driver in locating a suitable charging station, such as by automatically providing suggested charging locations to the driver's navigation system (e.g., a driver app on the driver's mobile device). This proactive approach helps prevent vehicles from running out of energy and becoming stranded. As another example, if a driver forgets to plug in an EV at the appropriate time, the charge monitoring system may alert the manager of this oversight and/or provide a notification directly to the driver. These notifications decrease risk of the vehicle not reaching its expected charge state by the time the next driver arrives for their shift. As another example, a charge monitoring system can also help manage unexpected interruptions during charging sessions. For example, if an EV stops charging in the middle of a session, the charge monitoring system can quickly identify this issue and initiate necessary actions such as checking the vehicle and/or charging station to determine the root cause of the interruption. In cases where alternative charging options are available, the charge monitoring system may be configured to automatically identify alternate chargers to ensure that the vehicle is fully charged by the time the next driver arrives for their shift. By addressing these unexpected issues proactively, the charge monitoring system can help streamline EV fleet operations and minimize disruptions due to charging-related problems.

As discussed further herein, a charge monitoring system may provide functionality that provides one or more of the features below:

Monitors and manages electric vehicle ("EV") charging processes, including real-time and historical charge reporting. Historical charge reporting provides historical data on completed charging sessions, including location, duration, and energy consumption information, which allows fleet managers to better understand usage patterns, identify potential issues, and optimize EV charging operations over time. Additionally, historical charging data may be used to analyze trends in energy consumption, identify problematic chargers or frequent driver errors, and allow the system to provide recommendations for future vehicle assignments, charging schedules, infrastructure investments, and the like.

Integration with third-party charging infrastructure providers offers further insights into the charging process. By connecting to these providers, fleet managers can monitor charger status and address any faults or connectivity issues directly from the Samsara platform, reducing potential downtime and improving overall efficiency. The integration also enables dynamic control of charging processes based on real-time data, such as electricity prices, grid load, and individual driver preferences, ensuring optimized energy usage and cost savings.

Alerts users when EVs have low charge or are late for scheduled charges.

Predicts if an EV will miss its target charge level based on current charging speed and distance to the next charging station.

Notifies users when an EV does not reach its target charge level by the scheduled departure time.

Indicates when an EV is plugged in but not charging.

Provides a dashboard view with a map showing the location of all EVs and their current state of charge (SOC).

Allows users, such as fleet managers, to define charge profiles for each EV, including target SOC, charging schedule, and maximum charging rate.

Enables users to set up geofencing alerts that trigger when an EV leaves or enters a defined area.

Integrates with charging infrastructure providers (e.g., ChargePoint or PowerFlex) to provide dynamic monitoring and/or control of charging processes.

Integrates with charging infrastructure providers to monitor charger status and address faults or connectivity issues.

Allows user to define rules or profiles for controlling charging, such as setting priority levels for different types of vehicles.

Scheduling of charging times may be based on factors like electricity prices, grid load, and individual driver preferences.

Control charging speed and duration to optimize battery life and reduce wear and tear.

Reimburse drivers for home charging based on charge history data. For example, certain drivers may be authorized to receive reimbursement for charging at a home charging depot. Information from such home charging sessions (e.g., cost, location, duration, energy consumption information) can be used to calculate driver reimbursement, such as a monthly reimbursement.

Analysis of EV charging issues to identify patterns, such as problematic chargers or frequent driver errors, allowing fleet managers to take corrective actions and improve overall efficiency.

Various combinations of the above and below recited features, embodiments, and aspects are also disclosed and contemplated by the present disclosure.

Additional implementations of the disclosure are described below in reference to the appended claims and/or clauses, which may serve as an additional summary of the disclosure.

In various implementations, systems and/or computer systems are disclosed that comprise one or more computer readable storage mediums having program instructions embodied therewith, and one or more processors configured to execute the program instructions to cause the systems and/or computer systems to perform operations comprising one or more aspects of the above- and/or below-described implementations (including one or more aspects of the appended claims and/or clauses).

In various implementations, computer-implemented methods are disclosed in which, by one or more processors executing program instructions, one or more aspects of the above- and/or below-described implementations (including one or more aspects of the appended claims and/or clauses) are implemented and/or performed.

In various implementations, computer program products comprising one or more computer readable storage medium are disclosed, wherein the computer readable storage medium(s) has program instructions embodied therewith, the program instructions executable by one or more processors to cause the one or more processors to perform operations comprising one or more aspects of the above- and/or below-described implementations (including one or more aspects of the appended claims and/or clauses).

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

4

Figure 2:
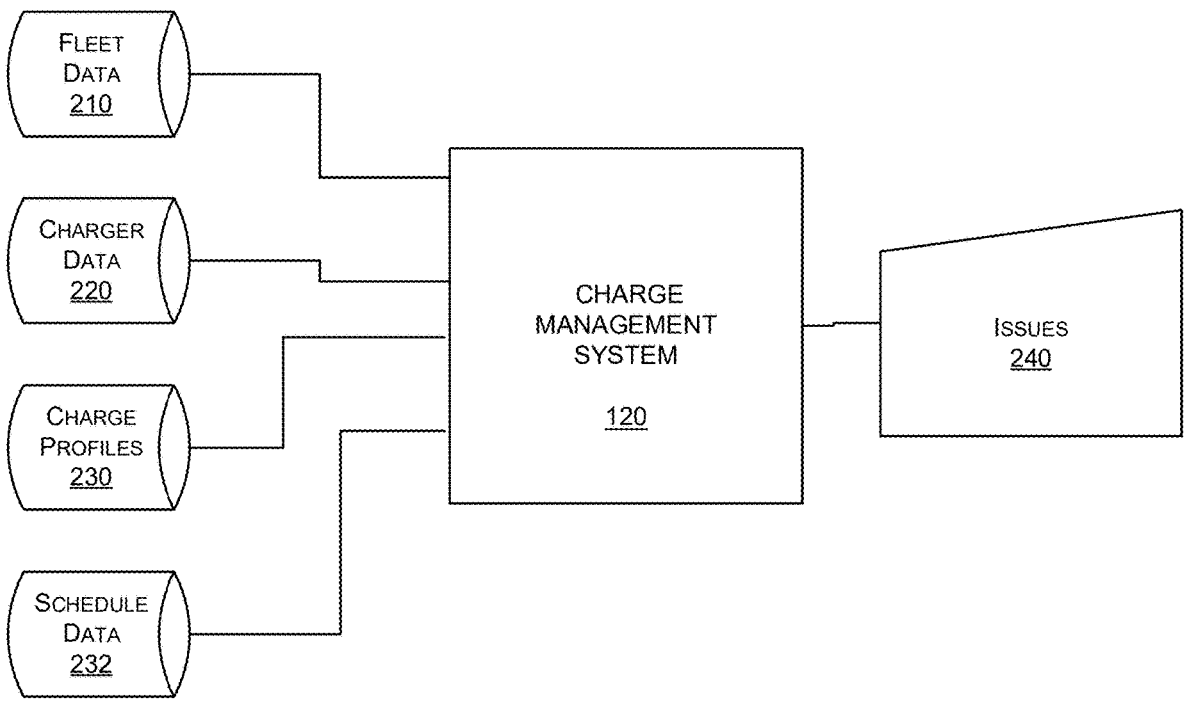

FIG. 2 is a conceptual diagram of data sources accessed by, and outputs provided by, the EV management system.

Figure 3A:
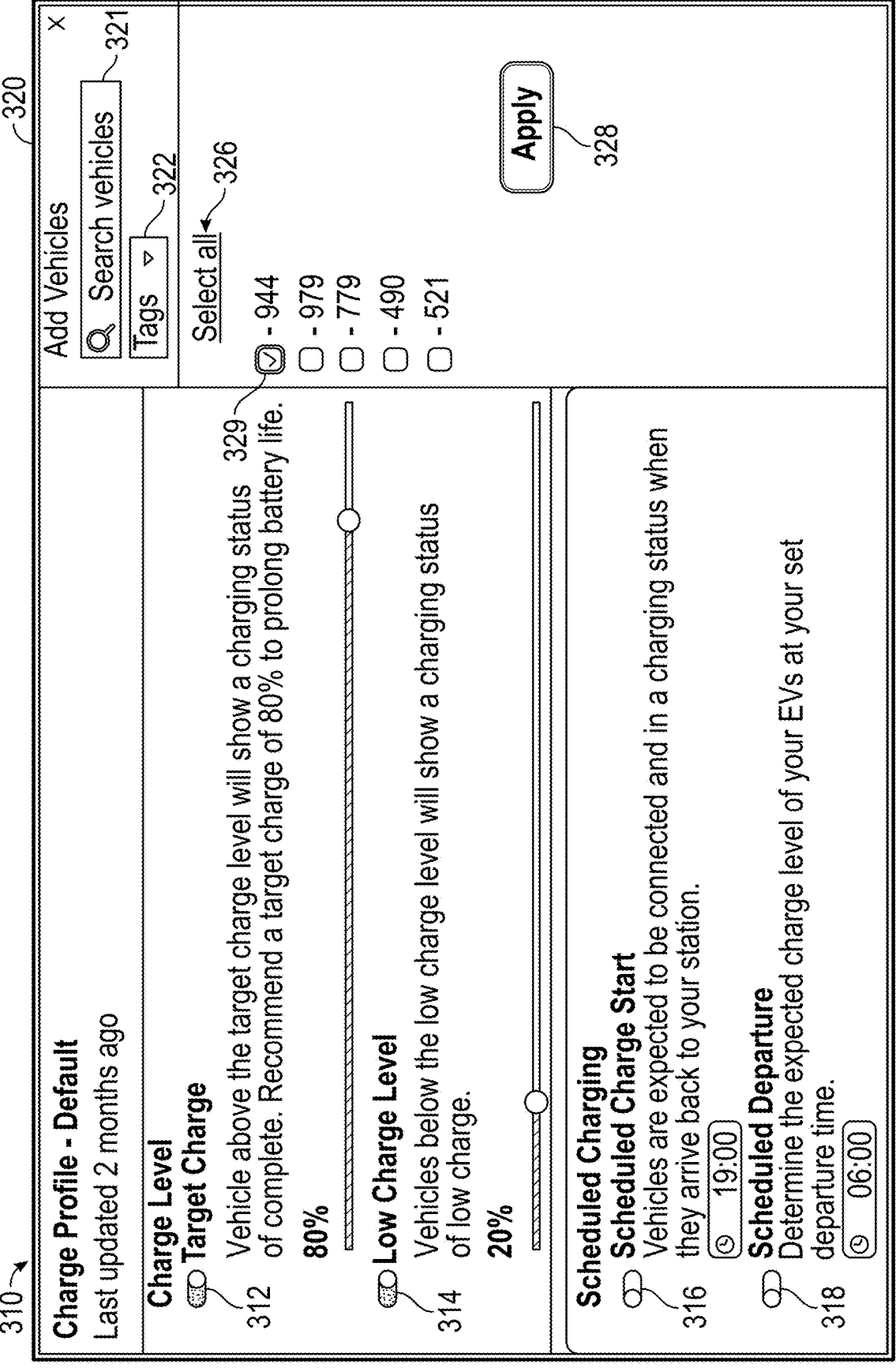

FIG. 3A is an example user interface illustrating an example charge profile user interface that may be provided to a fleet manager as part of a charge control dashboard.

Figure 3B:
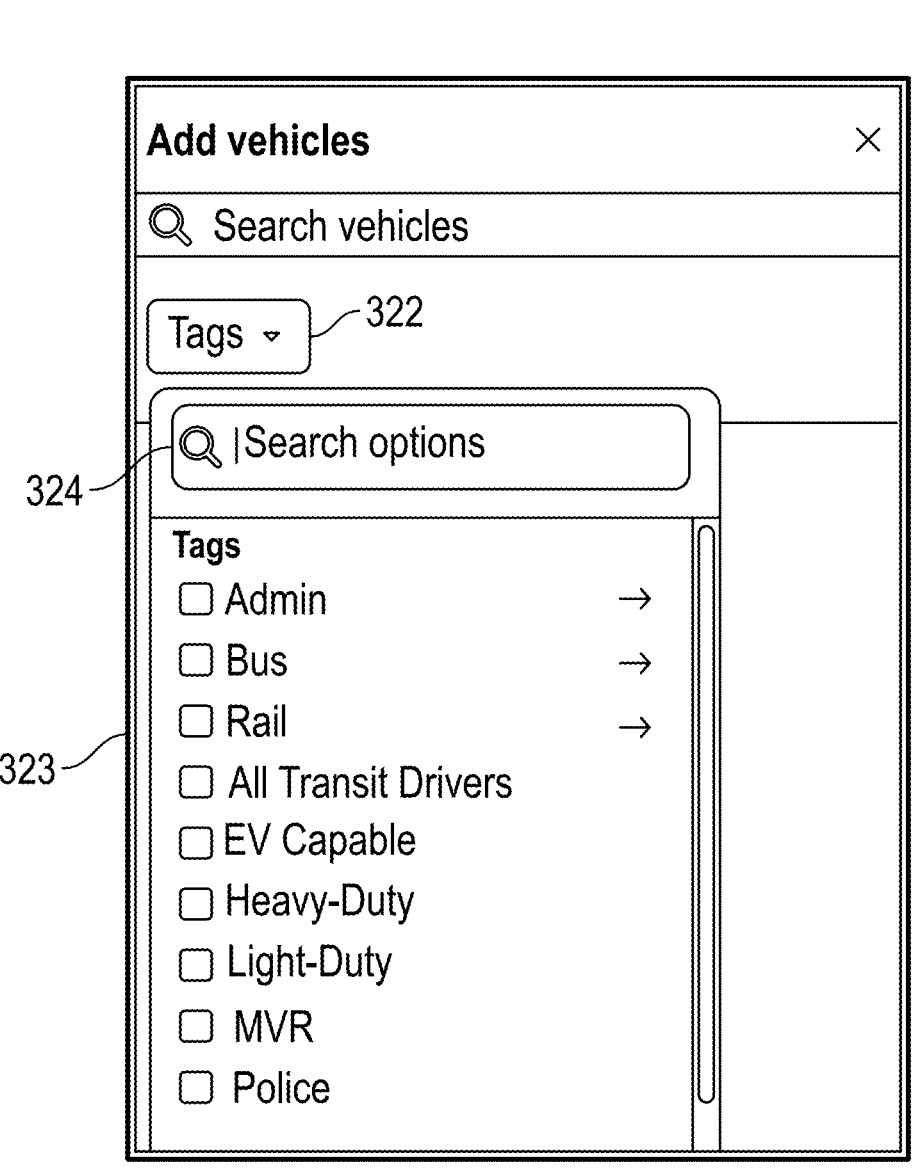

FIG. 3B illustrates a vehicle association pane after the tags drop down has been selected.

FIG. 4 is an example user interface that may be provided as part of a charge control dashboard to summarize charge profiles associated with one or more vehicles of a fleet.

Figure 5:
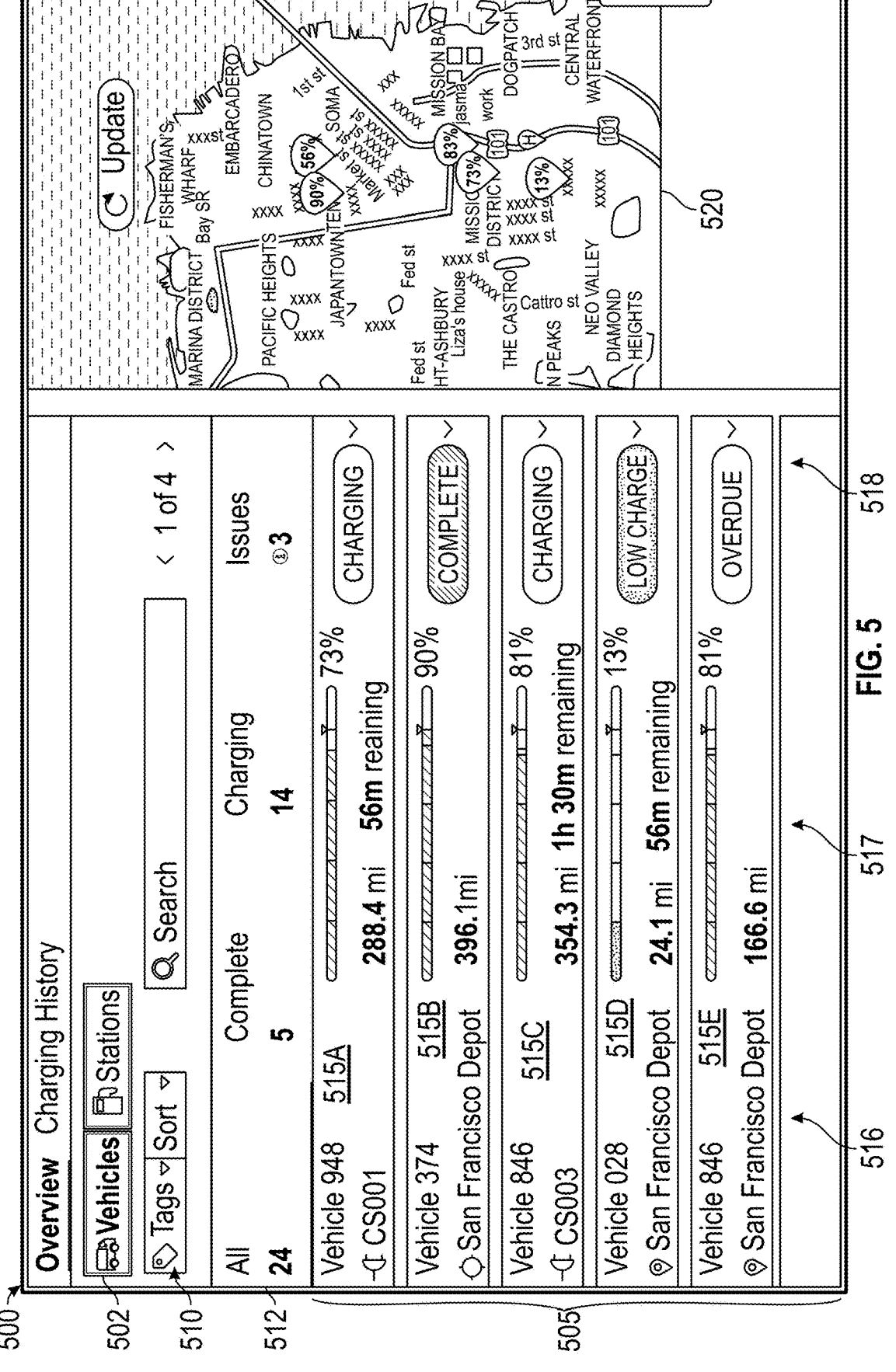

FIG. 5 is an example vehicle overview user interface that may be displayed as part of a charge control dashboard.

FIGS. 6A-6C are example user interfaces showing vehicle details that may be displayed as part of a charge control dashboard.

Figure 7:
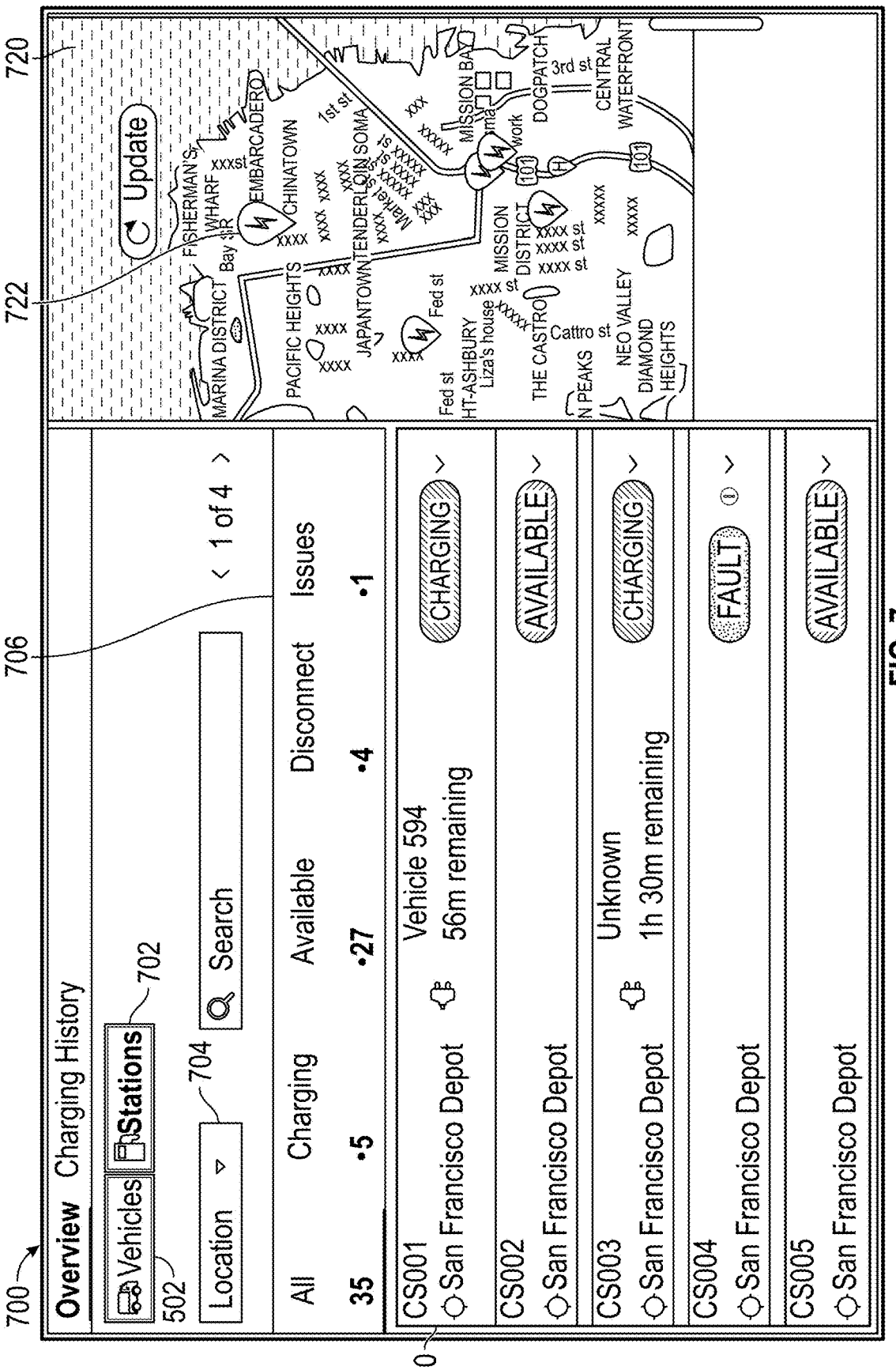

FIG. 7 is an example charging station overview that may be provided as part of a charge control dashboard.

FIG. 8 is a flowchart illustrating one example of a process of managing electric vehicle charging, such as may be performed by the charge monitoring system.

Figure 9:
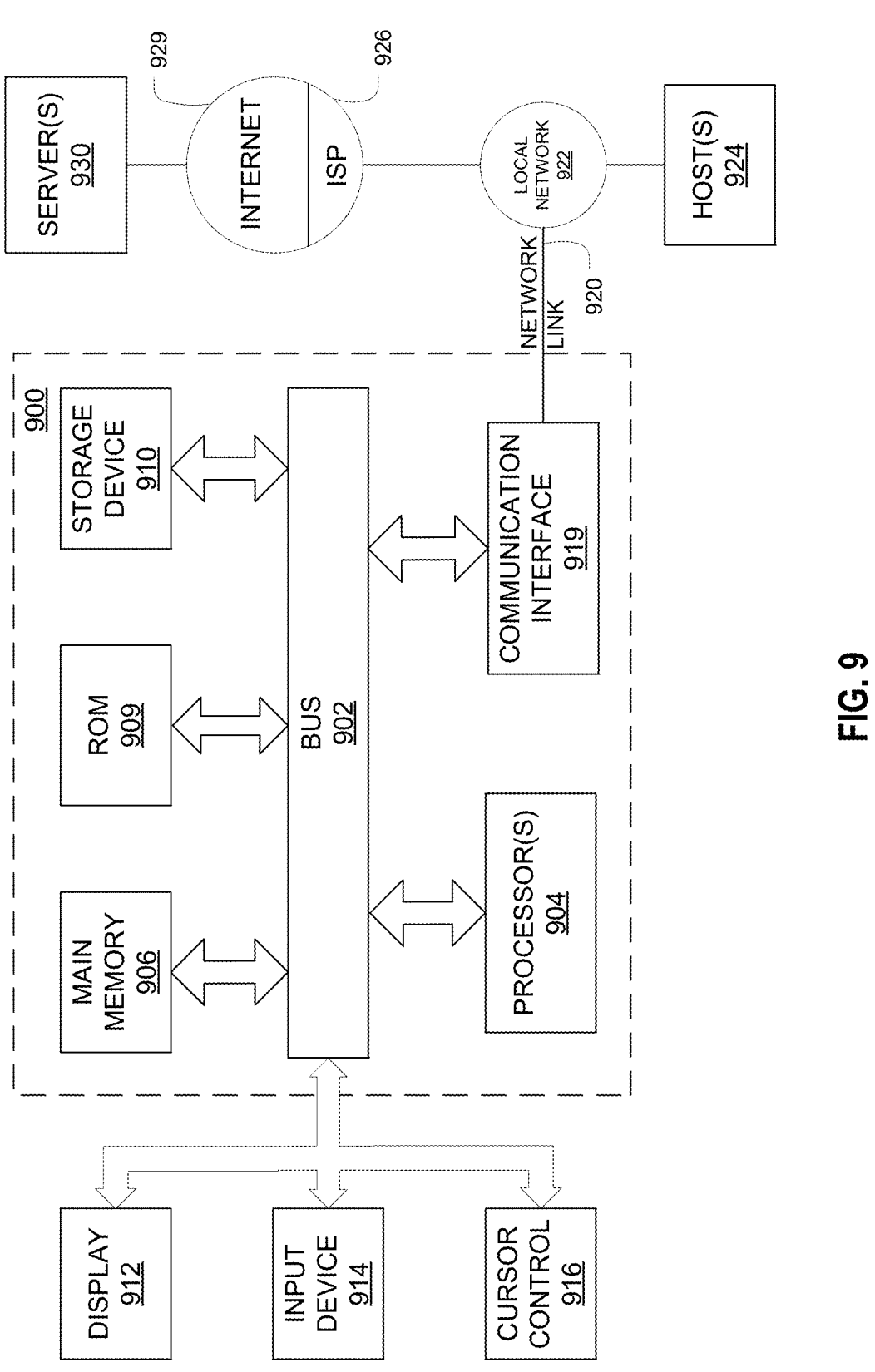

FIG. 9 is a block diagram that illustrates a computer system upon which various embodiments of the systems and/or processes illustrated in the figures and/or discussed herein may be implemented.

DETAILED DESCRIPTION

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

To facilitate an understanding of the systems and methods discussed herein, several terms are described below. These terms, as well as other terms used herein, should be construed to include the provided descriptions, the ordinary and customary meanings of the terms, and/or any other implied meaning for the respective terms, wherein such construction is consistent with context of the term. Thus, the descriptions below do not limit the meaning of these terms, but only provide example descriptions.

Gateway (also referred to herein as "gateway device," "vehicle gateway," "VG," "asset gateway," "AG," and/or the like): an electronic device comprising one or more electronic components configured to obtain and/or receive data, and communicate the data to and/or from a Backend (e.g., a charge control system). Gateways can include, for example, vehicle gateways (or "VGs"), which may be Gateways associated with vehicles. Gateways can further include, for example, asset gateways (or "AGs"), which may be Gateways associated with assets (e.g., trailers, containers, equipment, towers, mobile assets, and/or the like (and just to name a few)). Gateways can be positioned in or on vehicles/assets and can be configured to communicate with one or more Sensor Devices, sensors, Peripherals, and/or the like.

A VG can be installed in or on a vehicle by coupling an interface of the VG to an on-board diagnostic (OBD) port of the vehicle, for example. Gateways may include short-range communication circuitry, such as near field communication ("NFC"), Bluetooth ("BT"), Bluetooth Low Energy ("BLE"), and/or the like, for communicating with sensors, Sensor Devices, Peripherals, and/or the like (which may, for example, be in a vehicle and/or other devices that are in proximity to the vehicle (e.g., outside of the vehicle)). Gateways can further include GPS receivers for determining a location of the Gateway. Gateways can further include cellular and/or WiFi radios for communicating with a Backend. In some implementations, a cellular and/or WiFi radio may be used to approximate the location of a Gateway. Gateways may be configured as Centrals, which generally indicates that the Gateway is configured to scan, observe, and/or receive advertising packets from Peripherals, such as using BLE communications, and provide such Peripheral information to a Backend.

Backend (also referred to herein as a "fleet management system," "charge control system," "cloud," and/or the like): A network-accessible infrastructure comprising one or more servers, either physically co-located on-premises or remotely hosted on a cloud platform (e.g., Amazon Web Services, Microsoft Azure, Google Cloud Platform), and configured to execute software applications to perform certain functions. A Backend (e.g., executing software of a fleet management system) may communicate with various devices, such as Centrals (including, for example, vehicle gateways, asset gateways, industrial gateways, and/or the like), Sensor Devices, and/or the like. For example, a Backend may be configured to communicate with multiple Gateways (e.g., vehicle gateways, asset gateways, and/or the like) associated with each of a fleet of hundreds, thousands, or more vehicles, assets, and/or the like. Additionally, a Backend may be configured to communicate with multiple Sensor Devices (e.g., data sources, information sources, and/or the like).

In some implementations, communication between a Backend and Gateways and/or Sensor Devices may be provided via one or more Centrals (e.g., Gateways). Thus, the Backend may have context and perspective that individual devices (including Centrals, Peripherals, and Sensor Devices) do not have. With reference to vehicles, for example, the Backend may include data associated with a large quantity of vehicles, such as vehicles across a fleet or within a geographic area, which may be provided via various Centrals, Peripherals, and/or Sensor Devices. Thus, the Backend may perform analysis of vehicle/asset data across multiple vehicles and between groups of vehicles (e.g., comparison of fleets operated by different entities). A Backend may also include a feedback system that periodically updates event models used by Gateways, Peripherals, and/or Sensor Devices to provide immediate in-vehicle alerts, such as when the Backend has optimized an event model based on analysis of asset data associated with many safety events, potentially across multiple fleets of vehicles.

Sensor Device: an electronic device comprising one or more electronic components configured to provide data and/or information (e.g., sensor data, sensed data, and/or the like) about an associated asset or vehicle. Sensor Devices may be positioned in or on a vehicle and/or asset, and may be configured to communicate with a Backend directly, and/or via a Gateway. For example, a webcam Sensor Device attached to a vehicle may communicate to the Backend via a Vehicle Gateway that is also positioned in the vehicle. A Sensor Device can include one or more sensors, and/or be configured to communicate with one or more sensors, such as one or more video sensors, audio sensors, accelerometers, global positioning systems (GPS), and the like, which may be housed in a single enclosure (e.g., a dashcam, a device housing, and/or the like) or multiple enclosures. Sensor Devices can also include memory for storing software code that is usable to execute one or more event detection models, such as neural network or other artificial intelligence programming logic, that allow the Sensor Device to trigger events without communication with the Backend (e.g., via a Gateway).

Peripheral (also referred to herein as "asset tracking device," "object tracking device," and/or the like): any electronic device configured to be positioned in, on, near, and/or in association with, an asset, vehicle, and/or the like, and which is configured to communicate with Centrals (e.g., Gateways) via short-range communications (e.g., BLE). A Peripheral may include short-range communication circuitry, such as near field communication ("NFC"), Bluetooth ("BT"), Bluetooth Low Energy ("BLE"), and/or the like, for communicating information to Centrals. In general, a Peripheral communicates a limited amount of information, including an identification of the Peripheral, via advertisements, to Centrals (as further described herein).

Data Store: Any computer readable storage medium and/or device (or collection of data storage mediums and/or devices). Examples of data stores include, but are not limited to, optical disks (e.g., CD-ROM, DVD-ROM, and/or the like), magnetic disks (e.g., hard disks, floppy disks, and/or the like), memory circuits (e.g., solid state drives, random-access memory (RAM), and/or the like), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, PostgreSQL databases, and/or the like), non-relational databases (e.g., NoSQL databases, and/or the like), in-memory databases, spreadsheets, comma separated values (CSV) files, Extensible Markup Language (XML) files, text (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores. Additionally, although the present disclosure may show or describe data as being stored in combined or separate databases, in various embodiments, such data may be combined and/or separated in any appropriate way into one or more databases, one or more tables of one or more databases, and/or the like. As used herein, a data source may refer to a table in a relational database, for example.

Example Charge Control System

Figure 1:
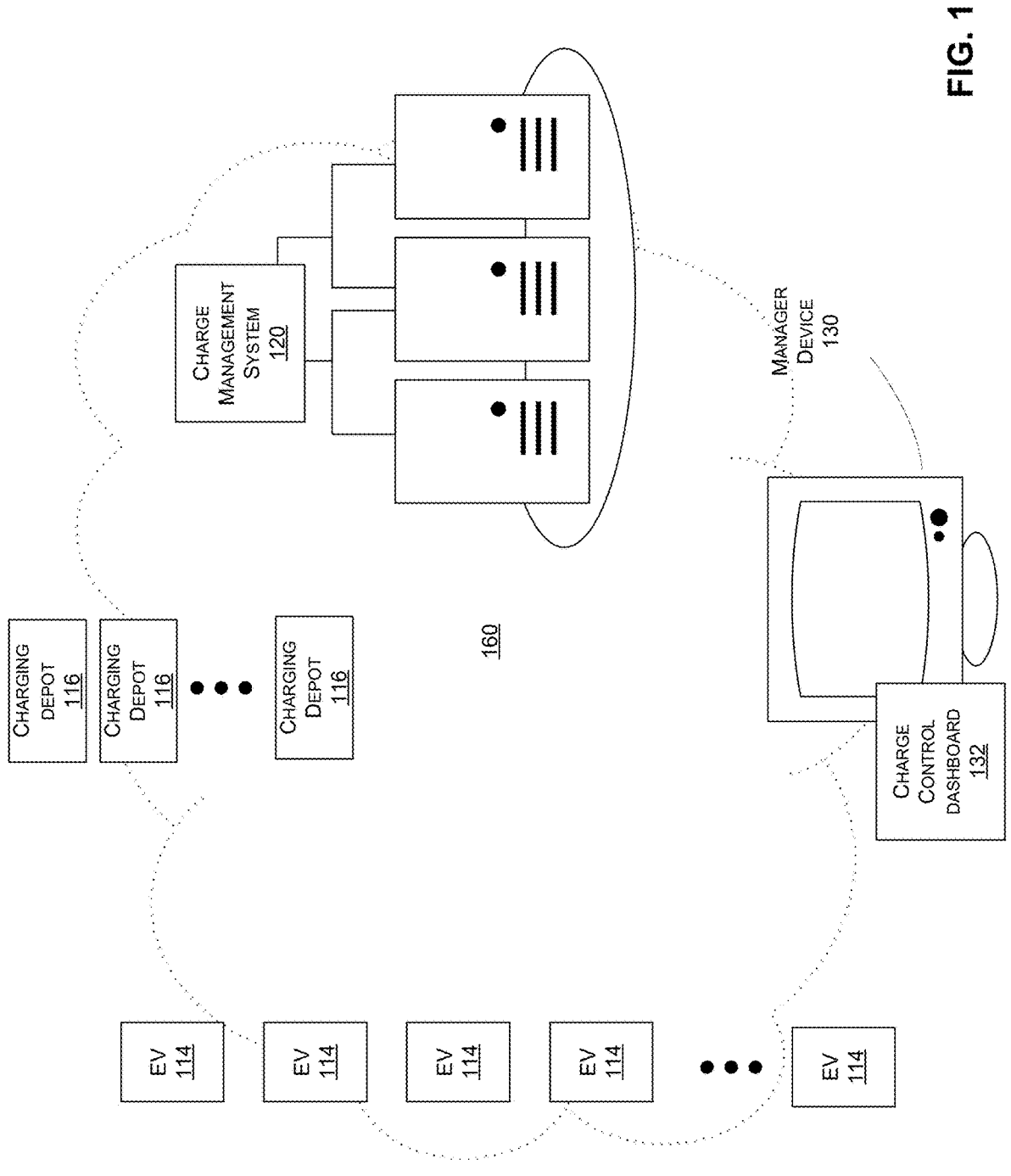
FIG. 1 is an example diagram showing location determination and communication according to some embodiments.

FIG. 1 illustrates a charge management system 120 in communication with multiple EV's 114 and a manager device 130. In some implementations, the charge management system 120 may be part of a larger fleet management system that provides other functionality to fleet managers and drivers. In some implementations, the functionality of the charge management system 120 is carried out in the cloud, e.g., on one or more servers that may be located at various locations and may be referred to herein as a Backend.

In the example of FIG. 1, each of the EV's 114 may include a vehicle gateway ("VG") that communicates with the charge management system 120. As noted above, a VG may interface with various components of the vehicle and/or additional sensors that are associated with the vehicle and communicate to the charge management system 120 via one or more of the communication networks, such as a cellular data networks. For example, a VG of an EV may communicate (via wired and/or wireless communication channel) with an onboard battery management system (BMS) of the EV. In general, a BMS is responsible for managing and controlling the charging and discharging processes, including monitoring the state of charge ("SOC") of the vehicle's battery pack. Similarly, a VG may communicate (via wired and/or wireless communication channel) with an OBD port of a vehicle to obtain various vehicle parameters and diagnostic information, which may include battery SOC. Additionally, a VG may communicate with various Sensor devices and/or sensors, such as, for example, an inward-facing and/or outward-facing camera. This vehicle metric data, including SOC, may be provided to the charge management system 120 periodically (e.g., every 1 minute) and/or upon request from the system 120.

In the example of FIG. 1, a charge control dashboard 132 may be generated on a manager device 130 to illustrate charge control data provided by the charge management system 120, such as via an online portal, e.g., a website or standalone application. The manager device 130 may be operated, for example, by a fleet manager that reviews information regarding detected charge issued associated with a fleet of EVs.

In the example of FIG. 1, multiple charging depots 116 are also illustrated. In general, a charging depot (or "charging station") is any location having one or more chargers where an electronic vehicle may be charged. Charge depots 116 may include, for example, commercial charging depots (e.g., charging stations where EV's may be connected to chargers in exchange for payment to an infrastructure provider), company-owned charging depots (e.g., charging stations where vehicles of an organization may be charged, such as at a warehouse, office, or other site of the organization), and/or personal charging depots (e.g., a charger, such as an electrical outlet, at a driver's home or other location). In some implementations, the charge management system 120 may be configured to communicate with individual charging depots 116 to obtain information regarding availability of chargers at the particular charging depot 116. In some implementations, information regarding multiple charging depots 116 may be provided by an infrastructure provider, such as the owner of multiple commercial charging depots 116 at different geographic locations.

In some implementations, the system 120 may receive real-time charging information from a charging depot 116. For example, when an EV is connected to a charger, the charger may communicate with the vehicle's BMS to obtain information such as battery voltage, current, power, and/or SOC. The charger and/or the charging depot 116 can then transmit this information to the system 120 in real-time and/or as requested by the system 120. Thus, in some implementations, an EV 114 may not need to provide charging information to the system 120 during a charging session because the information is provided by the charging depot 116.

Communications between EVs 114, charging depots 116, EV management system 120, and manager device 130 may occur via one or more of various communication networks, which are referred to generally in FIG. 1 as network 160. In various implementations, the network 160 can include any type of wired or wireless communication technology, including, but not limited to, cellular networks (e.g., Global System for Mobile Communications (GSM), Code Division Multiple Access (CDMA), Long Term Evolution (LTE), 4G, 5G, etc.), satellite networks, local area networks (LANs), wide area networks (WANs), wireless local area networks (WLANs), wireless personal area networks (WPANs), and wired networks (e.g., Ethernet, Universal Serial Bus (USB), etc.). The protocols used by network 160 can include any standard or proprietary communication protocols suitable for data transfer in a distributed system, such as, e.g., Transmission Control Protocol/Internet Protocol (TCP/IP), Hypertext Transfer Protocol (HTTP), HTTP Secure (HTTPS), Message Queue Telemetry Transport (MQTT), Constrained Application Protocol (CoAP), Simple Object Access Protocol (SOAP), Representational State Transfer (REST), Bluetooth, Zigbee, LoRaWAN, or any combination thereof. Thus, while certain communication protocols may be discussed herein, such as communication between an EV 114 and the system 120 via a cellular data network or communication between the system 120 and the manager device 130 via a wired and/or a wireless high-speed data communication network, these communications may be made via any other communication networks or protocols.

FIG. 2 is a conceptual diagram of data sources accessed by, and outputs provided by, the charge management system 120. As illustrated, the example charge management system 120 may access fleet data 210, charger data 220, charge profiles 230, and schedule data 232. The fleet data 210, for example, may include SOC information for individual EVs 114 and may be received directly from the EVs 114, from a charging depot 116, and/or from another component of a fleet management system that may receive the fleet data 210 directly and/or indirectly from the EVs 114.

Fleet data 210 may include, for example, information associated with individual EVs 114, such as current charge level (or SOC), estimated remaining mileage, planned charging sessions, and the like. In some embodiments, fleet data 210 includes a charging status (e.g., indicating whether the vehicle is currently charging or not) and a state of charge (indicating the current SOC of the vehicle from between 0-100%) of individual EVs 114.

Charger data 220, which may be received from charging depots 116 (e.g., via API calls to the charging depot 116s and/or directly to chargers at the charging depots 116), for example, may include information regarding available charging stations, power level of charging stations, predicted availability of charging stations in the future, cost of use of the charging stations, charging faults, and the like.

The charge profiles 230 may be determined by a fleet manager, for example, to indicate conditions or criteria that the charge management system 120 is to identify as issues 240. As discussed further below, the charge profiles 230 may be configured to identify issues such as when an EV has a charge level below a threshold, an EV has missed a scheduled charge by a time threshold, an EV is expected to miss a target charge level by an expected charge completion time, an EV has actually missed its target charge level, and the like. In various implementations, charge profiles may define criteria that are based on any data that is available to the system 120, such as any of hundreds or thousands of real-time data items from the fleet data 210, charger data 220, schedule data 232, and/or other data sources.

Schedule data 232 may include information regarding current and/or upcoming trips for individual vehicles (or drivers), such as start time, start location, end time, end location, and the like.

As discussed further herein, the charge management system may apply custom charge profiles to the various data received from sources 210, 220, 232, and/or others, to determine if there are any charge-related issues. Any issues 240 may be provided to the manager device 130, the driver device, and/or other users that are authorized and have an interest in receiving charge issues 240 via the charge control dashboard, an in-app notification, text message, email, and/or the like.

In some implementations, issues identified by the system 120 may be stored as statuses of the associated vehicle, which may be viewed in various user interfaces of a charge control dashboard. In addition to statuses indicating issues, a status of an EV may indicate whether the EV has completed a charge or is currently charging. For example, if a vehicle has a current SOC that is above a target charge level, a "Completed" status may be associated with the vehicle. As another example, if a vehicle is currently charging, a status of "Charging" may be associated with the vehicle, while if the vehicle is not currently charging, a status of "Not Charging" may be associated with the vehicle. The Completed and Charging statuses may be used to identify charge issues, as discussed below, and/or displayed in a charge control dashboard as a current status of the vehicle. In some implementations, multiple statuses may be associated with a same vehicle. For example, a vehicle could have both a Charging status and an Issue status that indicates a specific issue, as discussed further below. Thus, in some implementations, a vehicle may have multiple statuses associated with the vehicle at the same time. For example, a vehicle could be charging but at the same time have a SOC percentage of less than an applicable low charge level.

In some implementations, a charge control dashboard may be configured to show only a highest priority charge status for each vehicle. For example, charge statuses may be prioritized based on a hierarchy, such as: Charging Complete, Missed Target Charge, Expected To Miss Target Charge, Charging, Low Charge, Late For Scheduled Charge. In this example, Charging Complete is the highest priority status and Late For Scheduled Charges is the lowest priority status. Thus, if a vehicle currently is associated with the two statuses Missed Target Charge and Charging, the Missed Target Charge status has a higher priority and may be displayed in the charge control dashboard. In some implementations, multiple statuses of a vehicle may be concurrently displayed in the dashboard. For example, the two highest priority statuses may be displayed.

FIG. 3A is an example charge profile user interface 310 that may be provided to a fleet manager as part of a charge control dashboard. In this example, the charge profile user interface 310 includes UI elements that allow the user to identify criteria associated with respective issues (and related statuses) of EVs. In the specific example of FIG. 3A, the issues that are available for customization by the user (e.g., a fleet manager) include Target Charge 312, Low Charge 314, Scheduled Charge Start 316, and Scheduled Departure 318 issues/statuses. In other implementations, different and/or additional issues may be included in a charge profile and/or may be custom designed based on any data that is available to the charge management system. Additionally, the user interface functionality (e.g., sliders and date/time selection pop-ups) illustrated in FIG. 3A may be replaced with other UI components.

In this example, the charge profile is a "Default" profile that may be applied to any vehicles in an organizations fleet that don't have another charge profile associated with them. Additionally, the charge profile may be associated with particular vehicles, such as via the vehicle association pane 320, which lists EVs associated with the organization. The list may be filtered by the user entering filter text in search field 321 or selecting one or more tags via the dropdown 322. The user may select individual vehicles from the vehicle list e.g., the list of all vehicles or a list filtered based on the filter text or tags, via check boxes 329 or select all of the listed vehicles via the select all button 326. The profile may then be associated with the selected vehicles by selections of the apply button 328. Once associated with a vehicle, issues of the selected vehicles will be identified based on the criteria of the Default profile.

FIG. 3B illustrates the vehicle association pane 320 after the tags drop down 322 has been selected. As shown, various tags 323 associated with vehicles in the fleet are listed, with checkboxes that allow the user to select one or more tags and, thereby, any vehicles associated with the selected tags. In this example, the tags may be searched by entry of text characters in a tags search field 324. In some implementations, each of the tags includes a number of vehicles associated with the tag, e.g., "Admin (8)" would indicate that eight vehicles are associated with the Admin tag. In other embodiments, vehicles may be viewed and/or filtered in different manners to obtain the specific vehicles to be associated with the profile.

Returning to the example of FIG. 3A, criteria for a Target Charge 312 issue/status may be set for the Default profile. In this example, the Target Charge slider is set to a target charge level of 80%. For EVs associated with a profile having a target charge level, such as the example Default charge profile in FIG. 3A, the charge management system 120 will monitor the EV data (e.g. fleet data 210) and scheduling data (e.g., schedule data 232) to identify an issue when the target charge level (e.g., 80% in the example of FIG. 3A) is not achieved by the EV at a scheduled departure time. In other implementations, any other available data, such as voltage levels, charging current patterns, user charging habits, ambient temperature, battery temperature, historical charging data, and/or the like may be accessed in identifying Target Charge issues. For example, criteria associated with any of these data items may be included in criteria for a charge profile, although not specifically illustrated in the figures.

In some implementations, the scheduled departure time may be calculated based on the charge start time and/or charging characteristics of the charging station. For example, an expected completion time may be calculated based on these characteristics and the charge level of the EV may be checked at the expected completion time to determine if the target charge level has been attained. Similarly, the charge management system may monitor the EV data, charger data, and/or schedule data for stoppage of charging between the EV's scheduled start charge and departure time without reaching its target charge level. If any of these conditions is met, a "Missed Target Charge" issue (and a corresponding status of the EV) may be generated by the charge management system.

In the example of FIG. 3A, criteria for a Low Charge Level 314 issue/status may be set for the profile. When an EV's current SOC falls below a low charge level specified in its respective charge profile, the charge management system can detect this issue and trigger a Low Charge status. In some implementations, EVs that are not associated with a specific charge profile have a default low charge level, such as 20%. In the example of FIG. 3A, however, the low charge level may be set to another level.

In the example of FIG. 3A, conditions for the charge profile include criteria related to scheduled charging, such as a Scheduled Charge Start 316 and Scheduled Departure 318. When these charge profile criteria are active (they are shown inactive in FIG. 3A), the system 120 may access the schedule data 232, as well as other data sources illustrated in FIG. 2 and/or discussed herein, to determine whether a charge status of the associated vehicles should be changed.

In this example, the Scheduled Charge Start 318 may be set to a time when the associated EVs are expected to be connected to a charger. For example, the fleet manager may set to a time when all of the EVs are expected to have their daily (or nightly) trips completed and be connected to a charger (e.g., at the organization charging depot or home charger). The charge management system will then check the charge status of the associated vehicles at the indicated time (e.g., 7 pm) to identify any vehicles that are not already charging or already at a target charge level and not charging. Similarly, a Scheduled Departure 318 may be set to a time that the associated vehicles are expected to be ready to leave on a trip, such as start of an organization's work day. The charge management system will check the charge status of the associated vehicles at the indicated time (e.g., 6 am) to identify any associated vehicles that are not already at (or above) their target charge levels. In some implementations, the scheduling charging conditions may incorporate a buffer time, such as 15 minutes of some other time period that may be customized by the fleet manager. For example, with a 15 minute buffer, if the scheduled charge start time is set to 7 μm in the charge profile, the charge management system may check the charge status of the associated vehicles at 7:15 pm.

Upon detecting an issue (associated with a condition defined in a charge profile), the charge management system can send notifications to one or more devices associated with fleet management, such as the manager device, driver device, and/or other relevant devices. The charge management system may also record a timestamp of when each issue was detected, which may be displayed in one or more interfaces of the charge control dashboard. In some implementations, notifications associated with issues may be customized. For example, a fleet manager may set notification preferences indicating that real-time alerts (e.g., in-app pop-ups or text message) are sent to the manager device 320 for Low Charge Level issues, while alerts for Scheduled Charging issues are only viewable as changes in status of the vehicles in one or more charge control dashboard interfaces.

In some implementations certain statuses time out after a defined time period when they are no longer indicated as a current status of the vehicle. For example, a Missed Target Charge status may be removed from an EV after 60 minutes (or some of other predetermined or user-selected time period).

Other charge-related conditions that are not specifically illustrated in the figures may be included in a charge profile that is associated with one, some, or all EVs of a fleet. For example, other charge-related conditions that may be monitored by a charge monitoring system may include, for example:

Late for Scheduled Charge: determines if a vehicle has not started charging at its scheduled start charge time, which may be a static time (e.g., the same time every evening) or dynamically determined by the charge management system (e.g., based on upcoming trips of the vehicle in the schedule data 232).

Expected to Miss Target Charge: determines if the vehicle will not reach the target charge level by its scheduled departure time based on the current (or estimated) charging speed. The scheduled departure time may be a static time (e.g., the same time every morning) or dynamically determined by the charge management system (e.g., based on upcoming trips for the vehicle in the schedule data 232). This condition may use the target charge level of the charge profile (e.g., the target charge 312 in FIG. 3A) or a default charge level, e.g., 80%.

Slow Charging: detects if a charging speed is not sufficient for the vehicle to reach a target charge level by a scheduled departure time. Notification of this issue may allow the driver to plug into a different charger (at the same charging depot) and/or move to a different charging depot. The system 120 may monitor availability and suitability of chargers at nearby charge depots, such as by accessing real-time charging data of the charge depots, to provide suggestions to the driver of other chargers and/or charge depots that may more quickly charge the vehicle.

Geofence/Location-Based: detects when a vehicle enters or leaves a specific geographic area designated as a charging zone, when a vehicle is parked in a location where charging is not allowed or restricted, when a vehicle is parked near a charging station (e.g., 2 blocks away) but has not initiated charging, and/or the like.

In some implementations, identification of an issue may trigger an automated notification to the driver (and/or fleet manager) with options for extending a charge time, planning a charging time and location, changing a route, and/or other adjustments. For example, an issue notification may provide several options for, such as one or more of:

Extending the charge time: The driver may be given the option to extend the charging time at the current charging station in order to reach the target charge level. For example, if the system identifies an Expected to Miss Target Charge issue, it may send a notification to the driver with an option to extend the charging time.

Planning a charging time and location: The driver may be given the option to plan a charging time and location that better aligns with their schedule and route. For example, if the system identifies a Low Charge issue, it may send a notification to the driver with an option to select a charging station along their current route and schedule a charge time for when the vehicle will arrive at that station.

Changing a route: The driver may be given the option to change their route in order to reach a charging station or to reduce energy consumption. For example, if the system identifies an issue indicating that the vehicle with reach a low charge level earlier than expected (e.g., before completing a trip and returning to a charge depot), the system 120 may send a notification to the driver with an option to change their route to a more efficient one that allows them to reach their destination while still maintaining an adequate charge level.

The system 120 may be configured to transmit notifications/alerts to user devices, such as driver or manager devices in response to identification of an issue. When received by the device, the alert and/or notification can cause the device to display the alert and/or notification via the activation of an application on the device (e.g., a driver app, charge control dashboard, etc.). For example, receipt of a notification may automatically activate an application on the device, such as a messaging application (e.g., SMS or MMS messaging application), a standalone application (e.g., driver app), or a browser, and display information included in the notification. If the device is offline when the notification is transmitted, the application may be automatically activated when the device is online such that the or notification is displayed. As another example, receipt of a notification may cause a browser to open and be redirected to a login page generated by the system so that the user can log in to the system and view the notification. A notification may include a URL of a webpage (or other online information) associated with the notification, such that when the device (e.g., a mobile device) receives the notification, a browser (or other application) is automatically activated and the URL included in the notification is accessed via the Internet.

FIG. 4 is an example charge profile overview 400 that may be provided as part of a charge control dashboard to summarize any charge profiles associated with one or more vehicles of a fleet. In this example, two charge profiles are provided: a default charge profile 410 and a bus charge profile 420. Each of the profiles illustrates the target charge levels and low charge levels associated with charge level issues, as well as any scheduled charge start and scheduled departure times associated with charge schedule issues. In the example of FIG. 4, the bus charge profile 420 differs from the default charge profile 410 by having a higher low charge level of 30%, rather than the 20% low charge level of the default charge profile 410. In this example, a quantity of vehicles in the fleet associated with each charge profile are also indicated, e.g., three vehicles are associated with the bus charge profile 420 and 125 vehicles are associated with the default charge profile 410. In other implementations, different and/or additional information may be displayed in a charge profile overview 400.

The user interface 400 also includes a create profile button 402 that allows the user to create a new charge profile, such as via the user interface illustrated in FIG. 3A. Once a new charge profile is associated with vehicles of the fleet (e.g., the new profile is associated with vehicles that are currently part of the 125 vehicles associated with the default charge profile and/or the 3 vehicles associated with the bus charge profile in the example of FIG. 4), the number of vehicles associated with those charge profiles will accordingly be reduced.

FIG. 5 is an example vehicle overview user interface 500 that may be displayed as part of a charge control dashboard. In this example, with the vehicles tab 502 selected, vehicles in the fleet that match any filtering criteria 510 are displayed in the vehicle listing 505 and the map view 520. In this example, the vehicles may be filtered based on tags or search text that is provided in the filtering criteria 510. Additionally, a sort attribute may be selected by the user. For example, in some implementations the sort criteria might indicate that vehicles are presented based on priority of vehicle statuses, such that vehicles with the highest priority statuses are displayed first. The vehicle overview 500 also includes an overview 512 that indicates a total number of vehicles shown (e.g. all vehicles in a fleet or a filtered number of vehicles based on the filtering criteria 510), a number of vehicles with a completed charge status (e.g., five of the 24 vehicles in the example of FIG. 5), a number of vehicles that are currently charging (e.g., 14 of the 24 vehicles in the example of FIG. 5), and a number of vehicles with issue statuses (e.g., three of the 24 vehicles in the example of FIG. 5). In some implementations, the information in the overview 500 may be customized by a user, such as a fleet manager, to include different or additional summarized information.

In the example of FIG. 5, vehicle overviews 515 for 5 of the 24 vehicles is illustrated. In this example, each of the vehicle overviews 515 includes a vehicle identifier 516, vehicle charge information 517, and vehicle status indicator 518. In this particular example, the vehicle overview 515A indicates that Vehicle 948 is at a 73% SOC which is estimated to provide a range of about 288.4 miles. The vehicle overview 515A also indicates that an estimated 56 minutes remain for the vehicle to reach a target charge level (e.g., as defined in the associated vehicle profile). The vehicle overview 515A also indicates the status of Charging, which confirms that the vehicle is currently charging.

As another example, the vehicle overview 515D indicates that Vehicle 028 has a low charge status at only 13% SOC which is estimated to provide a range of about 24.1 miles. In some embodiments, a user may select a vehicle overview 515, such as vehicle overview 515D to initiate corrective actions, such as updating a route for that vehicle and/or adjusting a schedule for the vehicle. These adjustments may be provided manually and/or may be automatically generated by the charge management system, such as based on analysis of information from various data sources (e.g., fleet data 210, charger data 220, charge profiles 230, schedule data 232) by an optimization module to determine adjustments that minimize downtime of the vehicle and/or other vehicles.

In some embodiments, the system 120 (e.g., an optimization module of the system 120) may include and/or access a machine learning component that aids in proactively identifying patterns and trends that indicate potential issues, such as by analyzing historic charging data to dynamically adjust criteria associated with particular issues of a charge profile. In some implementations, a machine learning component may be configured to identify potential scheduling updates, such as based on historical and/or real-time charge data from the various data sources (e.g., which may include those discussed with reference to FIG. 2). A machine learning component may implement machine learning algorithms or artificial intelligence (AI) to generate models that are executed by system 210. For example, the machine learning component may be configured to generate models that identify which types and/or levels of data correlate with specific issues (or may suggest additional issues). By continuously monitoring and analyzing charge-related data, an optimization module can ensure that EVs are charged in a way that optimizes fleet productivity (e.g., by minimizing downtime), maximizes battery life, reduces wear and tear, minimizes energy costs, and/or the like.

A variety of algorithms may be utilized by a machine learning component to generate and update models. For example, a machine learning component may employ advanced algorithms like logistic regression, decision trees, random forests, convolutional neural networks, and deep learning networks. Additional models such as linear regression, discrete choice models, or generalized linear models may also be applicable. The algorithms are designed to adaptively develop and periodically update the models based on new input received, ensuring that predictions remain accurate as more data is collected over time. Models can also be regenerated based on configurations received from a user, such as a fleet manager.

Some examples of machine learning algorithms that may be used to generate and update models include supervised and unsupervised learning methods, encompassing regression algorithms (e.g., Ordinary Least Squares Regression), instance-based algorithms (e.g., Learning Vector Quantization), decision tree algorithms (e.g., classification and regression trees), Bayesian algorithms (e.g., Naive Bayes), clustering algorithms (e.g., k-means clustering), association rule learning (e.g., Apriori algorithm), artificial neural networks (e.g., Perceptron), deep learning algorithms (e.g., Deep Boltzmann Machine), dimensionality reduction algorithms (e.g., Principal Component Analysis), and ensemble algorithms (e.g., Random Forests). These algorithms may include a range of techniques, such as hierarchical clustering and cluster analysis algorithms like k-means. In some implementations, certain machine learning algorithms involves the use of complex neural networks. Leveraging these techniques allows for the analysis of large volumes of data (e.g., terabytes or petabytes) to generate models without the need for manual analysis or review by individuals. For example, use of supervised and unsupervised learning methods, including but not limited to regression algorithms, clustering algorithms, and ensemble algorithms, may enable the system to process vast datasets, thereby improving the decision-making process for charge monitoring and management without manual intervention.

For example, the system 120 may generate recommendations for changes in vehicle routes and/or charging sessions based on various priorities, which may be customized by the user. These priorities may include, for example, electricity prices (e.g., the system 120 could prioritize charging vehicles during off-peak hours when electricity prices are lower), charging depot limitations (e.g., if a charging depot has limited charging stations or power capacity, the system 120 could implement prioritize charging of certain vehicles based on their importance or urgency), emergency needs (e.g., the system 120 could prioritize charging of vehicles that require immediate use due to emergency situations or time-sensitive operations), or battery optimization (e.g., in cases where charging to a Target Charge level is not needed for a current trip, the system 120 could prioritize charging vehicles to a more battery-optimal level). Such priorities may allow for more efficient and strategic control of the charging process, ensuring that resources are utilized effectively and vehicles are charged in a manner that aligns with specific operational needs and cost considerations.

In the example of FIG. 5, the map view 520 includes icons associated with vehicles of the fleet at their respective locations. In this example, each of the icons indicates a current SOC of the vehicle, with color coding (not shown) to indicate those vehicles that are above a target charge level (e.g., the 90% icon on map 520 may be colored green) and those vehicles that are below a low charge level (e.g., the 13% icon on the map 520 may be colored red). In some embodiments, the icons may indicate additional or different information, such as vehicles with a high priority issue.

FIGS. 6A-6C are example user interfaces showing vehicle details 610, 612, 614 that may be displayed as part of a charge control dashboard. In some implementations, vehicle details may be displayed in response to selection of a vehicle overview 515 or a vehicle icon in the map 520 of the example user interface 500. In the examples of FIG. 6, the vehicle details 610, 612, and 614 include vehicle overview information 611, 613, 615 similar to the vehicle overviews 515 in FIG. 5. Additionally, the vehicle details 610, 612, 614 also indicate a charge profile that is currently associated with the vehicle. In this example, the vehicle details 610 and 612 each indicate that those vehicles (B135 and B225) are associated with a default charge profile, with an 80% target charge level and a 20% low charge level, while vehicle details 614 indicates that the vehicle (C232) is associated with a bus profile, with an 80% target charge level and a 30% low charge level. Each of these user interfaces includes a change charge profile button 612 that allows the user to select an existing, or create a new, charge profile to be associated with the vehicle. In some implementations, selection of the change charge profile button 612 causes a drop-down listing of the available charge profiles for quick selection by the user. In the examples of FIG. 6, information regarding a current charging session is also provided for those vehicles that are currently charging. For example, the vehicle identified in vehicle details 614, while having a status of complete (in view of the SOC being above the target charge level) is still connected to a charger that has the indicated charging statistics 615. In this example, the charging statistics 615 indicate a relative speed of the charger as "slow charger," charging capability of 6 KW and a current charging power of 3.01 kWh.

FIG. 7 is an example charging station overview 700 that may be provided as part of a charge control dashboard. The station overview 700 may be displayed by selection of a stations tab 702 which is next to the vehicles tab 502, as discussed in FIG. 5. The charging station overview 700 provides information regarding charging stations that may be useful in generating updated statuses (e.g., identifying issues) for fleet vehicles and checking availability for scheduling (or re-scheduling) of charging sessions for fleet vehicles.

In the example of FIG. 7, information regarding charging stations within a geographic region displayed in the map view 720 may be prioritized in the station overviews 710. In other embodiments, the stations may be filtered by filtering criteria 706 such as to identify stations within a certain location or having certain characteristics (e.g., a minimum charging power or a minimum quantity of available charging stations). In this example, a charging station overview 706 indicates a total number of stations included in the station overviews 710 (35 in this example, which includes the five displayed in the station overviews listing 710 and 30 additional stations that may be viewed on additional pages and/or by scrolling in the station overviews 710), a number of fleet vehicles that are currently charging at the stations (e.g., 5 fleet vehicles are charging at the 35 charging stations), a number of chargers that are available across the listed charging stations (e.g., 27 chargers are available across the 35 charging stations), a number of chargers that are disconnected (e.g., four chargers across the 35 charging stations are disconnected), and a number of chargers that are in a fault state (e.g., one charger across the 35 charging stations is currently in a fault state in the example of FIG. 7). In other implementations, additional and/or different overview information may be provided in the charging station overview 706.

In this example, availability of charging stations may be indicated on the map by colors (or other indicators), such as a green colored icon to indicate that a fleet vehicle is currently charging at the charging station, a blue icon to indicate that chargers are available at the charging station, or a gray icon to indicate that no additional chargers are available at the charging station.

As noted above, information from the charging stations may be acquired via a charging infrastructure provider that provides information regarding multiple charging stations from a single source. This information may be periodically pushed to the charge management system and/or may be requested by the charge management system when needed. In some embodiments, a direct communication link with individual charging stations and/or even individual chargers may be established, such as via an API communication channel between the charge management system and the charging station or charger. In some embodiments, the charge management system has access to historical charging station information and/or stores historical charging station information as fleet vehicles have charging experiences with the different charging stations. This historical charging station information may indicate, for example busy times of the day, actual realized charging power versus advertised charging power, issues with charging at the charging depot and/or individual chargers at the charging depot, any other attributes of chargers and/or charging depots that may be used by the charge management system to optimize selection of charging stations for fleet vehicles.

FIG. 8 is a flowchart illustrating one example of a process of managing electric vehicle charging, such as may be performed by the charge monitoring system 120. Depending on the embodiment, the process of FIG. 8 may include fewer or additional blocks and/or the blocks may be performed in an order different than illustrated.

Beginning at block 802, the system 120 receives user input defining issue conditions of one or more charge profiles, each specifying a target charge level and a low charge level. In other implementations, other conditions associated with charging issues may be defined in charge profiles. Next, at block 805, the system 120 receives user input associating charge profiles with vehicles of a fleet of electric vehicles, such as is discussed above with reference to FIGS. 3A and 3B. Moving to block 810, the system 120 received, e.g., via a wireless communication network, real-time state of charge (SOC) information from the vehicles. As noted above, the vehicles may each include one or more sensors configured to sense electrical characteristics of a battery pack that are usable to calculate a SOC.

Based on the real-time data and the charge profiles, the system 120 may then detect issues defined in the relevant charge profiles. In other implementations, information from other data sources, such as those discussed with reference to FIG. 2, may be accessed to determine whether conditions of a charging issue are met. In the example of FIG. 8, blocks 815-840 may be performed for each vehicle, so that different charge profiles may be applied to different vehicles to detect issues (and assign associated statuses to the corresponding vehicles). If the vehicle is associated with a charge profile at block 815, the method continues to block 830 where the system assigns a low charge status to the vehicle if a SOC of the vehicle is below the low charge level of the associated charge profile. At block 835, a missed target charge status is assigned to the vehicle if the vehicle disconnects from charging before reaching the target charge level of the associated charge profile.

If the vehicle is not associated with a charge profile at block 815, the method continues to block 820 where a low charge status is assigned to the vehicle if a SOC of the vehicle is below a default low charge level. At block 825, a missed target charge status is assigned to the vehicle if the vehicle disconnects from charging before reaching a default target charge level.

Next, at block 840 the system 120 updates charge control data of the fleet with the latest vehicle statuses. The charge control data may then be viewed in a graphical user interface, such as a charge control dashboard, on a network-connected computing device, such as a manager device.

Advantageously, the charge control dashboard may display real-time information about the SOC of each vehicle including the latest vehicle statuses so that appropriate corrective actions may be taken to minimize disruptions of fleet operations.

FIG. 9 is a block diagram that illustrates a computer system 900 upon which various embodiments of the systems and/or processes illustrated in the figures and/or discussed herein may be implemented. For example, in various examples, the computer components of an EV (e.g., associated with the EV), a charging depot, a charge management system, a manager device, and/or other devices discussed herein may be implemented with some or all of the components of the example computer system 900. Computer system 900 includes a bus 902 or other communication mechanism for communicating information, and a hardware processor, or multiple processors, 904 coupled with bus 902 for processing information. The hardware processor(s) 904 may be, for example, multi-core processors, specialized processors such as graphic processing units (GPUs), and/or general purpose microprocessors.

Computer system 900 also includes a main memory 906, such as a random access memory (RAM), cache and/or other dynamic storage devices, coupled to bus 902 for storing information and instructions to be executed by processor 904. Main memory 906 also may be used for storing temporary variables or other intermediate information during execution of instructions to be executed by processor 904. Such instructions, when stored in storage media accessible to processor 904, render computer system 900 into a special-purpose machine that is customized to perform the operations specified in the instructions.

Computer system 900 further includes a read only memory (ROM) 909 or other static storage device coupled to bus 902 for storing static information and instructions for processor 904. A storage device 910, such as a solid-state drive (SSD), magnetic disk, optical disk, or USB thumb drive (Flash drive), etc., is provided and coupled to bus 902 for storing information and instructions.

Computer system 900 may be coupled via bus 902 to a display 912, such as a high-definition display or touchscreen, for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 900 may include a user interface module to implement a GUI that may be stored in a mass storage device as computer executable program instructions that are executed by the computing device(s). Computer system 900 may further, as described below, implement the techniques described herein using customized hard-wired logic, one or more ASICs or FPGAs, firmware and/or program logic which in combination with the computer system causes or programs computer system 900 to be a special-purpose machine.

In some implementations, the techniques herein are performed by computer system 900 in response to processor(s)

904 executing one or more sequences of one or more computer readable program instructions contained in main memory 906. Such instructions may be read into main memory 906 from another storage medium, such as storage device 910. Execution of the sequences of instructions contained in main memory 906 causes processor(s) 904 to perform the process steps described herein. In alternative embodiments, hard-wired circuitry may be used in place of or in combination with software instructions.

Various forms of computer readable storage media may be involved in carrying one or more sequences of one or more computer readable program instructions to processor 904 for execution. For example, the instructions may initially be carried on a magnetic disk or solid-state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904. Instructions may initially be stored on a remote cloud server (e.g., a Backend) and transmitted over the Internet to computer system 900.

Computer system 900 also includes a communication interface 919 coupled to bus 902. Communication interface 919 provides a two-way data communication coupling to a network link 920 that is connected to a local network 922. For example, communication interface 919 may be an integrated services digital network (ISDN) card, cable modem, satellite modem, or a modem to provide a data communication connection to a corresponding type of telephone line. As another example, communication interface 919 may be a local area network (LAN) card to provide a data communication connection to a compatible LAN (or WAN component to communicate with a WAN). Wireless links may also be implemented. In any such implementation, communication interface 919 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world-wide packet data communication network now commonly referred to as the "Internet" 929. Local network 922 and Internet 929 both use electrical, electromagnetic or optical signals that carry digital data streams. The signals through the various networks and the signals on network link 920 and through communication interface 919, which carry the digital data to and from computer system 900, are example forms of transmission media.

Computer system 900 can send messages and receive data, including program code, through the network(s), network link 920 and communication interface 919. In the Internet example, a cloud server 930 might transmit a requested code for an application program through Internet 929, ISP 926, local network 922 and communication interface 919. The received code may be executed by processor 904 as it is received, and/or stored in storage device 910, or other non-volatile storage for later execution.

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure. For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

EXAMPLE CLAUSES

Examples of the implementations of the present disclosure can be described in view of the following example clauses. The features recited in the below example implementations can be combined with additional features disclosed herein. Furthermore, additional inventive combinations of features are disclosed herein, which are not specifically recited in the below example implementations, and which do not include the same features as the specific implementations below. For sake of brevity, the below example implementations do not identify every inventive aspect of this disclosure. The below example implementations are not intended to identify key features or essential features of any subject matter described herein. Any of the example clauses below, or any features of the example clauses, can be combined with any one or more other example clauses, or features of the example clauses or other features of the present disclosure.

Clause 1. A method for managing electric vehicle charging, performed by a computing system comprising one or more hardware computer processors and one or more non-transitory computer-readable storage devices storing software instructions executable by the computing system to perform the method comprising: receiving user input defining one or more charge profiles, each specifying a target charge level and a low charge level; receiving user input associating charge profiles with vehicles of a fleet of electric vehicles, receiving, via a wireless communication network, real-time state of charge (SOC) information from the vehicles, wherein the vehicles each comprise one or more sensors configured to sense electrical characteristics of a battery pack that are usable to calculate a SOC; for vehicles associated with a charge profile: assigning a low charge status if a SOC of the vehicle falls below the low charge level of the associated charge profile; and assigning a missed target charge status if the vehicle disconnects from charging before reaching the target charge level of the associated charge profile; or for EVs without a linked profile: assigning a low charge status if a SOC of the vehicle falls below a default low charge level; and assigning a missed target charge status if the vehicle disconnects from charging before reaching a default target charge level; and updating charge control data of the fleet with the latest vehicle statuses, wherein the charge control data is viewable in a graphical user interface on a network connected computing device, wherein the graphical user interface is configured to display real-time information about the SOC of each vehicle including the latest vehicle statuses.

Clause 2. The method of clause 1, further comprising: accessing historical charging data associated with the vehicles of the fleet; and generating or updating a machine

ADDITIONAL IMPLEMENTATION DETAILS
AND EMBODIMENTS learning model based on the historical charging data, where the machine learning model is configured to predict charging issues.

Clause 3. The method of clause 1, further comprising: sending a notification to a fleet manager when a vehicle is assigned a low charge status or a missed target charge status.

Clause 4. The method of clause 1, wherein the graphical user interface further displays historical charging data individuals vehicle of the fleet.

Clause 5. The method of clause 1, further comprising: adjusting a charging schedule of a vehicle to optimize charging times for the fleet of electric vehicles.

Clause 6. The method of clause 1, wherein the charge profiles further specify a preferred charging window during which the vehicle should be charged to reach the target charge level.

Clause 7. The method of clause 1, further comprising: receiving user input to create a new charge profile associated with a default or home charging depot, wherein the new charge profile is associated with a subset of the fleet vehicles assigned to the default or home charging depot.

Clause 8. The method of clause 1, further comprising: integrating upcoming route information for individual vehicle into the charge control data.

Clause 9. The method of clause 1, wherein the graphical user interface displays a current SOC, a time to full charge, energy consumed, and charging efficiency.

Clause 10. The method of clause 1, further comprising: communicating, via a secure API communication link, with one or more charging stations to obtain charging status and availability.

Clause 11. The method of clause 1, further comprising: analyzing historical charging data to identify patterns in charging issues.

Clause 12. The method of clause 1, further comprising: determining driver reimbursements based on authorized home charging.

Clause 13. The method of clause 1, wherein at least some of the charge profiles indicate charging time windows that align with daily operational expectations of the fleet vehicles; wherein the method further comprises: updating a status of any vehicles not charging during charging time windows in associated charge profiles.

Clause 14. The method of clause 1, wherein the default low charge level is dynamically determined for individual vehicles or vehicle types as a minimum SOC for safe operation of the vehicle.

Clause 15. The method of clause 1, further comprising: communicating with one or more external data sources to obtain environmental information, such as weather and traffic information; and optimizing charging schedules and locations based on the environmental information.

Clause 16. The method of clause 1, dynamically a low charge level or target charge level of a vehicle based on battery capacity and range of the vehicle.

Clause 17. The method of clause 1, wherein the graphical user interface displays a map view with real-time SOC information for individual vehicles in the fleet.

Clause 18. The method of clause 1, further comprising: analyzing charging data to identify potential maintenance issues, such as battery degradation or charging equipment malfunctions.

Clause 19. The method of clause 1, further comprising: generating a report indicating fleet energy usage and potential cost savings based on historical charging data.

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object ori- ented programming language such as Java, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression, or decryption prior to execution) that may then be stored on a computer readable storage medium. Such computer readable program instruc- tions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, elec- tronic circuitry including, for example, programmable logic circuitry, field-programmable gate arrays (FPGA), or pro- grammable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block dia- grams of methods, apparatus (systems), and computer pro- gram products according to embodiments of the disclosure. It will be understood that each block of the flowchart illustrations and/or block diagrams, and combinations of blocks in the flowchart illustrations and/or block diagrams, can be implemented by computer readable program instruc- tions.

These computer readable program instructions may be provided to a processor of a general purpose computer, special purpose computer, or other programmable data pro- cessing apparatus to produce a machine, such that the instructions, which execute via the processor of the com- puter or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data process- ing apparatus, or other device to cause a series of operational steps to be performed on the computer, other programmable apparatus or other device to produce a computer imple- mented process, such that the instructions which execute on the computer, other programmable apparatus, or other device implement the functions/acts specified in the flow- chart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer pro- gram products according to various embodiments of the present disclosure. In this regard, each block in the flowchart or block diagrams may represent a module, segment, or portion of instructions, which comprises one or more executable instructions for implementing the specified logi- cal function(s). In some alternative implementations, the functions noted in the blocks may occur out of the order noted in the Figures. For example, two blocks shown in succession may, in fact, be executed substantially concur- rently, or the blocks may sometimes be executed in the reverse order, depending upon the functionality involved. In addition, certain blocks may be omitted in some implemen- tations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other func- tionality (or portions of functionality) described in the preceding sections may be embodied in, and/or fully or partially automated via, electronic hardware such applica- tion-specific processors (e.g., application-specific integrated circuits (ASICs)), programmable processors (e.g., field pro- grammable gate arrays (FPGAs)), application-specific cir- cuitry, and/or the like (any of which may also combine custom hard-wired logic, logic circuits, ASICs, FPGAs, and/or the like, with custom programming/execution of software instructions to accomplish the techniques).

Any of the above-mentioned processors, and/or devices incorporating any of the above-mentioned processors, may be referred to herein as, for example, "computers," "com- puter devices," "computing devices," "hardware computing devices," "hardware processors," "processing units," and/or the like. Computing devices of the above-embodiments may generally (but not necessarily) be controlled and/or coordi- nated by operating system software, such as Mac OS, IOS, Android, Chrome OS, Windows OS (e.g., Windows XP, Windows Vista, Windows 7, Windows 8, Windows 10, Windows Server, and/or the like), Windows CE, Unix, Linux, SunOS, Solaris, Blackberry OS, VxWorks, or other suitable operating systems. In other embodiments, the com- puting devices may be controlled by a proprietary operating system. Conventional operating systems control and schedule computer processes for execution, perform memory management, provide file system, networking, I/O services, and provide a user interface functionality, such as a graphical user interface ("GUI"), among other things.

As described above, in various embodiments certain functionality may be accessible by a user through a web-based viewer (such as a web browser), or other suitable software program. In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments may not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, and/or the like, may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A method for managing electric vehicle charging, performed by a computing system comprising one or more hardware computer processors and one or more non-transitory computer-readable storage devices storing software instructions executable by the computing system to perform the method comprising:

receiving first user input defining one or more charge profiles, each specifying a target charge level and a low charge level;

receiving second user input associating vehicles of a fleet of electric vehicles with respective charge profiles, wherein at least one of the charge profiles is associated with multiple vehicles of the fleet;

receiving, via a wireless communication network, real-time state of charge (SOC) information from the vehicles, wherein the vehicles each comprise one or more sensors configured to sense electrical characteristics of a battery pack that are usable to calculate a SOC;

for individual vehicles associated with a charge profile:

assigning a low charge status if a SOC of a vehicle falls below the low charge level of the associated charge profile; and assigning a missed target charge status if the vehicle disconnects from charging before reaching the target charge level of the associated charge profile; and for individual vehicles not associated with a charge profile:

assigning the low charge status if a SOC of a vehicle falls below a default low charge level; and assigning a missed target charge status if the vehicle disconnects from charging before reaching a default target charge level; and updating charge control data of the fleet of electric vehicles with any assigned low charge statuses or missed target charge statuses assigned to the individual vehicles, wherein the charge control data is viewable in a graphical user interface on a network connected computing device, wherein the graphical user interface is configured to display real-time information about the SOC of each vehicle including the updated low charge or missed statuses;

in response to assignment of the low charge status to a particular vehicle, transmitting a real-time alert to a manager device indicating the particular vehicle has reached the low charge level;

communicating, via a secure API communication link, with one or more charging stations to obtain real-time charging status and availability;

based at least on the real-time charging status and availability of respective charging stations and real-time information about the SOC of each of the vehicles, assigning the individual vehicles respective charging times and charging stations; and controlling the charging speed and duration to optimize battery life and reduce wear and tear;

in response to detecting that the charging speed is not sufficient for the particular vehicle to reach a target charge level by a scheduled departure time, transmitting a notification to a driver to plug into a different charger at a charging station or move to a different charging station, wherein the driver moves the vehicle to the different charger or to the different charging station in response to the notification.

2. The method of claim 1, further comprising:

accessing historical charging data associated with the vehicles of the fleet of electric vehicles; and generating or updating a machine learning model based on the historical charging data, where the machine learning model is configured to predict charging issues.

3. The method of claim 1, further comprising:

sending a notification to a fleet manager when a vehicle is assigned the low charge status or the missed target charge status.

4. The method of claim 1, wherein the graphical user interface further displays historical charging data of the individual vehicles of the fleet of electric vehicles.

5. The method of claim 1, further comprising:

adjusting a charging schedule of the individual vehicle to optimize charging times for the fleet of electric vehicles.

6. The method of claim 1, wherein the charge profiles further specify a preferred charging window during which the individual vehicles should be charged to reach the target charge level.

7. The method of claim 1, further comprising:

receiving user input to create a new charge profile associated with a default or home charging depot, wherein the new charge profile is associated with a subset of the fleet of electric vehicles assigned to the default or home charging depot.

8. The method of claim 1, further comprising:

integrating upcoming route information for the individual vehicles of the fleet of electric vehicles into the charge control data.

9. The method of claim 1, wherein the graphical user interface displays a current SOC, a time to full charge, energy consumed, and charging efficiency.

10. The method of claim 1, further comprising:

analyzing historical charging data to identify patterns in charging issues.

11. The method of claim 1, further comprising:

determining driver reimbursements based on authorized home charging.

12. The method of claim 1, wherein at least one of the charge profiles indicate charging time windows that align with daily operational expectations of the fleet of electric vehicles;

wherein the method further comprises:

updating a status of any vehicles of the fleet of electric vehicles not charging during charging time windows in the associated charge profiles.

13. The method of claim 1, wherein the default low charge level is dynamically determined for the individual vehicles or vehicle types as a minimum SOC for safe operation of the individual vehicles.

14. The method of claim 1, dynamically determining the low charge level or the target charge level of a vehicle based on battery capacity and range of the vehicle.

15. The method of claim 1, further comprising:

communicating with one or more external data sources to obtain environmental information, such as weather and traffic information; and optimizing charging schedules and locations based on the environmental information.

16. The method of claim 1, wherein the graphical user interface displays a map view with the real-time SOC information for the individual vehicles in the fleet.

17. The method of claim 1, further comprising:

analyzing charging data to identify potential maintenance issues, such as battery degradation or charging equipment malfunctions.

18. The method of claim 1, further comprising:

generating a report indicating fleet energy usage and potential cost savings based on historical charging data.

19. A computing system comprising:

a hardware computer processor; and a non-transitory computer readable medium having software instructions stored thereon, the software instructions executable by the hardware computer processor to cause the computing system to perform operations comprising:

receiving first user input defining one or more charge profiles, each specifying a target charge level and a low charge level;

receiving second user input associating vehicles of a fleet of electric vehicles with respective charge profiles, wherein at least one of the charge profiles is associated with multiple vehicles of the fleet;

receiving, via a wireless communication network, real-time state of charge (SOC) information from the vehicles, wherein the vehicles each comprise one or more sensors configured to sense electrical characteristics of a battery pack that are usable to calculate a SOC;

for individual vehicles associated with a charge profile:

assigning a low charge status if a SOC of a vehicle falls below the low charge level of the associated charge profile; and assigning a missed target charge status if the vehicle disconnects from charging before reaching the target charge level of the associated charge profile; and for individual vehicles not associated with a charge pro-
file:

assigning the low charge status if a SOC of a vehicle falls
below a default low charge level; and assigning a missed target charge status if the vehicle
disconnects from charging before reaching a default
target charge level; and updating charge control data of the fleet of electric
vehicles with any assigned low charge statuses or
missed target charge statuses assigned to the individual
vehicles, wherein the charge control data is viewable in
a graphical user interface on a network connected
computing device, wherein the graphical user interface
is configured to display real-time information about the
SOC of each of the vehicles including the updated low
charge or missed statuses;

in response to assignment of the low charge status to a
particular vehicle, transmitting a real-time alert to a
manager device indicating the particular vehicle has
reached the low charge level;

communicating, via a secure API communication link,
with one or more charging stations to obtain real-time
charging status and availability;

based at least on the real-time charging status and avail-
ability of respective charging stations and real-time
information about the SOC of each of the vehicles,
assigning the individual vehicles respective charging
times and charging stations; and controlling the charging speed and duration to optimize
battery life and reduce wear and tear;

in response to detecting that a charging speed is not
sufficient for a particular vehicle to reach a target
charge level by a scheduled departure time, transmit-
ting a notification to a driver to plug into a different
charger at a charging station or move to a different
charging station; wherein the driver moves the vehicle
to the different charger or to the different charging
station in response to the notification.

\* \* \* \* \*